US011506075B2

(12) United States Patent
Sanchez Del Valle et al.

(10) Patent No.: US 11,506,075 B2
(45) Date of Patent: Nov. 22, 2022

(54) CONTROL OF POWER GENERATION SYSTEM BY VISUALLY MONITORING COMPONENT DURING OPERATION

(71) Applicant: General Electric Company, Schenectady, NY (US)

(72) Inventors: Luis Armando Sanchez Del Valle, Acworth, GA (US); John Robert Korsedal, IV, Greenville, SC (US); Philip Lee Schoonover, II, Cypress, TX (US); Jose Maria Gurria Llorente, Logroño (ES)

(73) Assignee: General Electric Company, Schenectady, NY (US)

( * ) Notice: Subject to any disclaimer, the term of this patent is extended or adjusted under 35 U.S.C. 154(b) by 676 days.

(21) Appl. No.: 16/504,617

(22) Filed: Jul. 8, 2019

(65) Prior Publication Data

US 2020/0408105 A1     Dec. 31, 2020

(51) Int. Cl.
*G01M 15/04* (2006.01)
*F01D 19/02* (2006.01)
(Continued)

(52) U.S. Cl.
CPC ............. *F01D 19/02* (2013.01); *F01D 21/12* (2013.01); *F02C 9/00* (2013.01); *F02C 9/28* (2013.01);
(Continued)

(58) Field of Classification Search
CPC ............ F01D 19/02; F01D 21/12; F02C 9/28; G01M 15/048; G01M 15/05; G01M 15/14
See application file for complete search history.

(56) References Cited

U.S. PATENT DOCUMENTS

| 6,327,896 B1 | 12/2001 | Veronesi et al. |
| 2011/0150626 A1 | 6/2011 | Kinzie et al. |

(Continued)

FOREIGN PATENT DOCUMENTS

| CN | 2926838 Y | 7/2007 |
| CN | 106782486 A | 5/2017 |

(Continued)

OTHER PUBLICATIONS

ES Search Report and Written Opinion and English Translation thereof for corresponding Spanish Patent Application No. 201930585 dated Dec. 13, 2019, 12 pages.

(Continued)

*Primary Examiner* — Eric S. McCall
(74) *Attorney, Agent, or Firm* — James Pemrick; Charlotte Wilson; Hoffman Warnick LLC

(57) ABSTRACT

Embodiments of the present disclosure include a method for controlling a power generation system, the method including: detecting a heat distribution across a component of a power generation system from a thermal output of the component, during operation of the power generation system; calculating a projected heat distribution across the component based on a library of modeling data for the power generation system; calculating whether a difference between the heat distribution and the projected heat distribution exceeds a thermal threshold; adjusting the power generation system in response to the difference exceeding the predetermined threshold, wherein the adjusting includes modifying an operating setting of the power generation system.

17 Claims, 9 Drawing Sheets

(51) Int. Cl.
  *F01D 21/12* (2006.01)
  *F02C 9/00* (2006.01)
  *F02C 9/28* (2006.01)
  *G01M 15/05* (2006.01)
  *G01M 15/14* (2006.01)

(52) U.S. Cl.
  CPC .......... G01M 15/048 (2013.01); G01M 15/05 (2013.01); G01M 15/14 (2013.01)

(56) References Cited

U.S. PATENT DOCUMENTS

| | | |
|---|---|---|
| 2013/0176418 A1 | 7/2013 | Pandey et al. |
| 2015/0241308 A1 | 8/2015 | Pandey et al. |
| 2016/0223422 A1* | 8/2016 | Bizub .................. G01M 15/12 |
| 2018/0284748 A1* | 10/2018 | Korsedal, IV ......... G06Q 50/06 |
| 2019/0017487 A1* | 1/2019 | Rudnitzki ............. F02D 41/009 |
| 2019/0049329 A1* | 2/2019 | Bizub .................. G01L 23/225 |
| 2020/0409321 A1* | 12/2020 | Sanchez Del Valle . H02J 3/381 |
| 2020/0409322 A1* | 12/2020 | Sanchez Del Valle ..................... G05B 19/042 |

FOREIGN PATENT DOCUMENTS

| | | |
|---|---|---|
| EP | 2415972 A2 | 2/2012 |
| EP | 2415973 A2 | 2/2012 |
| EP | 2562372 A2 | 2/2013 |
| EP | 3434884 A1 | 1/2019 |
| JP | 2003114294 A | 4/2003 |
| WO | 2019022918 A1 | 1/2019 |

OTHER PUBLICATIONS

EP Application No. 20181265.8, European Search Report dated Nov. 27, 2020, 8 pages.

* cited by examiner

CONTROL OF POWER GENERATION SYSTEM BY VISUALLY MONITORING COMPONENT DURING OPERATION

BACKGROUND

The disclosure relates generally to systems, methods, and program products for power generation systems. More particularly, embodiments of the disclosure provide features to control a power generation system by analysis of gauges, components, and/or valves of the system during its operation.

A power generation system may include one or more machines including several interconnected components, and various properties of the power generation system can be derived from conditions of these individual components. Examples of power generation systems may include, e.g., combustion based or non-combustion based power plants including a fleet of gas turbines and/or other machines therein. In the example of a combustion based power plant, gas turbine assemblies therein can generate mechanical energy by combusting a source of fuel intermixed with compressed air. These combustion reactions create mechanical power for driving a load component attached to the combustion-based power source (e.g., by a rotatable shaft).

The effectiveness of power generation systems may depend on their implementation, environment, and/or other factors such as manufacturing quality and state of operation (e.g., transient state or steady state). In addition, several user-driven and environmental factors can affect the performance of components in a power generation system, including the magnitude of intended energy output, efficiency or condition of individual components, and estimates of part and/or system lifespan.

Monitoring of a power generation system is a critically important process to determine the properties of various components within the power generation system. Such properties may include, e.g., the operating status of a component, the estimating time remaining before the component should be serviced, a recommended adjustment to one or more operating settings of the power generation system, etc. It is possible to monitor some components or attributes of a system via automation. However, various other components of a power generation system rely on an operator or servicer to visually monitor and report their characteristics. Such characteristics, e.g., the appearance of one or more machines, may not be discernable without visually inspecting the machine. Monitoring a power generation system by visual inspection carries various limitations, most particularly the time and costs associated with repeated inspections.

SUMMARY

A first aspect of the disclosure provides a method for controlling a power generation system, the method including: detecting a gauge measurement of an operating parameter while visually monitoring a gauge of the power generation system during operation of the power generation system; calculating an expected value of the operating parameter based on a library of modeling data for the power generation system; calculating whether a difference between the gauge measurement of the operating parameter and the calculated expected value of the operating parameter exceeds a predetermined threshold; and adjusting the power generation system in response to the difference exceeding the predetermined threshold, wherein the adjusting includes one of calibrating the gauge or modifying an operating setting of the power generation system.

A second aspect of the disclosure provides a program product stored on a computer readable storage medium for controlling a power generation system, the computer readable storage medium comprising program code for causing a computer system to perform actions including: detecting a gauge measurement of an operating parameter while visually monitoring a gauge of the power generation system during operation of the power generation system; calculating an expected value of the operating parameter based on a library of modeling data for the power generation system; calculating whether a difference between the gauge measurement of the operating parameter and the calculated expected value of the operating parameter exceeds a predetermined threshold; and adjusting the power generation system in response to the difference exceeding the predetermined threshold, wherein the adjusting includes one of calibrating the gauge or modifying an operating setting of the power generation system.

A third aspect of the disclosure provides a system for controlling a power generation system, the system including: a camera operable to visually monitor a gauge of the power generation system; a system controller in communication with the camera and operable to, during operation of the power generation system, perform actions including: detecting a gauge measurement of an operating parameter while visually monitoring the gauge of the power generation system via the camera; calculating an expected value of the operating parameter based on a library of modeling data for the power generation system; calculating whether a difference between the gauge measurement of the operating parameter and the calculated expected value of the operating parameter exceeds a predetermined threshold; and adjusting the power generation system in response to the difference exceeding the predetermined threshold, wherein the adjusting includes one of calibrating the gauge or modifying an operating setting of the power generation system.

A fourth aspect of the disclosure provides a method for controlling a power generation system, the method including: detecting a heat distribution across a component of a power generation system from a thermal output of the component, during operation of the power generation system; calculating a projected heat distribution across the component based on a library of modeling data for the power generation system; calculating whether a difference between the heat distribution and the projected heat distribution exceeds a thermal threshold; adjusting the power generation system in response to the difference exceeding the predetermined threshold, wherein the adjusting includes modifying an operating setting of the power generation system.

A fifth aspect of the disclosure provides a system for a program product stored on a computer readable storage medium for controlling a power generation system, the computer readable storage medium including program code for causing a computer system to perform actions including: detecting a heat distribution across a component of a power generation system based on a thermal output of the component, during operation of the power generation system; calculating a projected heat distribution across the component based on a library of modeling data for the power generation system; calculating whether a difference between the heat distribution and the projected heat distribution exceeds a thermal threshold; adjusting the power generation system in response to the difference exceeding the predetermined threshold, wherein the adjusting includes modifying an operating setting of the power generation system.

A sixth aspect of the disclosure provides a system for controlling a power generation system, the system including: an infrared camera operable to visually monitor a component of the power generation system; a system controller in communication with the infrared camera and operable to, during operation of the power generation system, perform actions including: detecting a heat distribution across a component of the power generation system based on a thermal output of the component; calculating a projected heat distribution across the component based on a library of modeling data for the power generation system; calculating whether a difference between the heat distribution and the projected heat distribution exceeds a thermal threshold; adjusting the power generation system in response to the difference exceeding the predetermined threshold, wherein the adjusting includes modifying an operating setting of the power generation system.

A seventh aspect of the disclosure provides a method for controlling a power generation system, the method including: detecting a valve position indicative of a flow rate while visually monitoring a valve of the power generation system during operation of the power generation system; calculating a target flow rate based on a library of modeling data for the power generation system; calculating whether a difference between the flow rate and the target flow rate exceeds a predetermined threshold; and adjusting the power generation system in response to the difference exceeding the predetermined threshold, wherein the adjusting includes one of modifying the valve position or modifying an operating setting of the power generation system.

An eighth aspect of the disclosure provides a program product stored on a computer readable storage medium for controlling a power generation system, the computer readable storage medium including program code for causing a computer system to perform actions including: detecting a valve position indicative of a flow rate while visually monitoring a valve of the power generation system during operation of the power generation system; calculating a target flow rate based on a library of modeling data for the power generation system; calculating whether a difference between the flow rate and the target flow rate exceeds a predetermined threshold; and adjusting the power generation system in response to the difference exceeding the predetermined threshold, wherein the adjusting includes one of modifying the valve position or modifying an operating setting of the power generation system.

A ninth aspect of the disclosure provides a system for controlling a power generation system, the system including: a camera operable to visually monitor a valve of the power generation system; a system controller in communication with the camera and operable to, during operation of the power generation system, perform actions including: detecting a valve position indicative of a flow rate while visually monitoring the valve of the power generation system; calculating a target flow rate based on a library of modeling data for the power generation system; calculating whether a difference between the flow rate and the target flow rate exceeds a predetermined threshold; and adjusting the power generation system in response to the difference exceeding the predetermined threshold, wherein the adjusting includes one of modifying the valve position or modifying an operating setting of the power generation system.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

Figure 1:
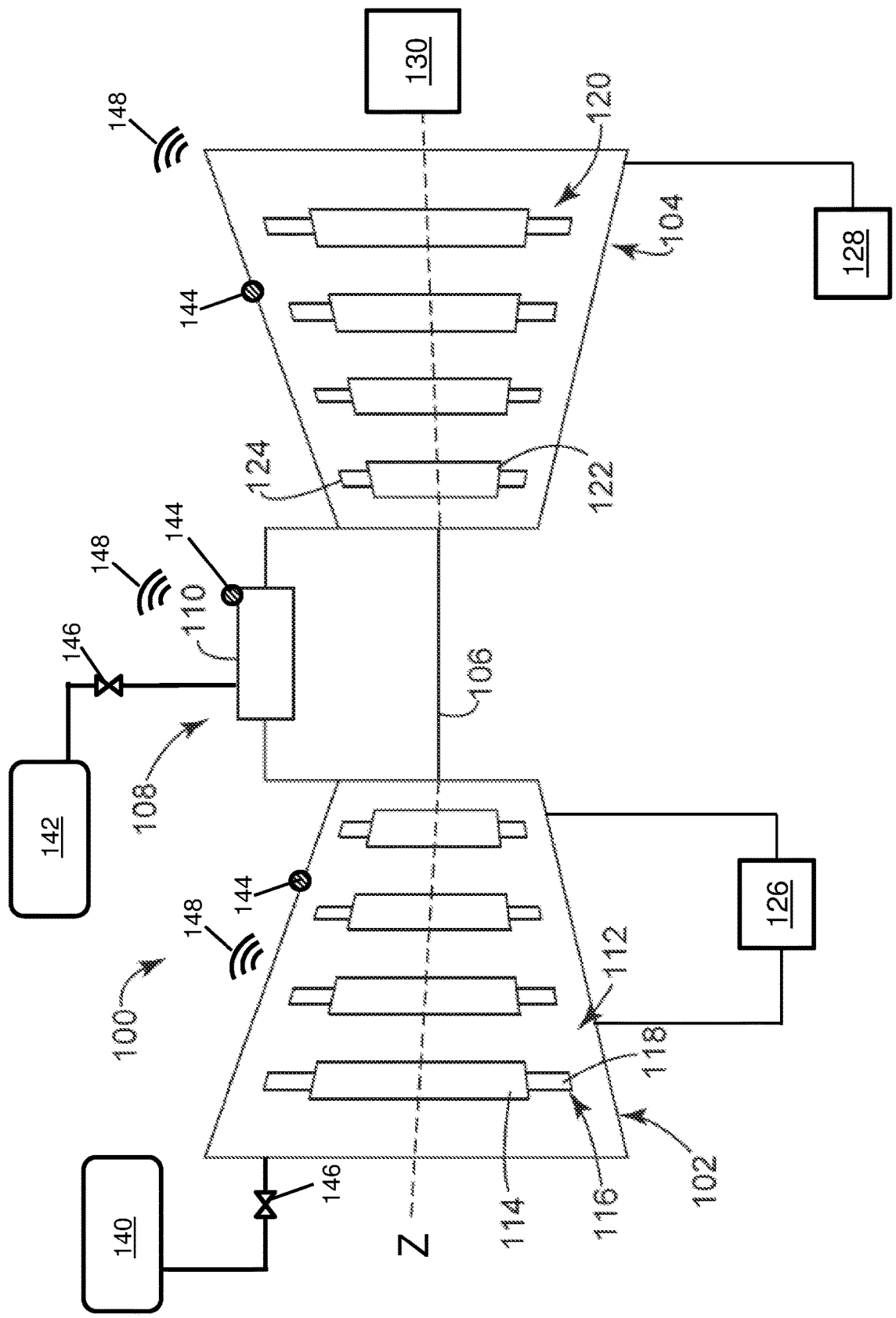
FIG. 1 provides a schematic view of an example power generation system in the form of a gas turbine.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component.

If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Embodiments of the present disclosure provide systems, program products, and methods for controlling a power generation system. In an example embodiment, a system according to the present disclosure can include a system controller or similar device in communication with one or more cameras and/or other devices configured to audio-visually monitor a particular area of the power generation system. The monitored area of the power generation system may include, e.g., one or more gauges for reporting operational parameters of the system, one or more components susceptible to thermal variability, one or more sensitive components where people or animals are prohibited during operation, one or more valve banks for controlling a fluid flow into or out of a component, etc.

In embodiments of the present disclosure, multiple cameras may be capable of visually monitoring one power generation system at multiple locations, and may also detect related inputs such as sound, infrared light, etc. A system controller in the form of, e.g., a computing device and/or other control system, may be communicatively connected to one or more cameras to monitor various operational parameters of the power generation system. The system controller may process images and/or other data collected by visual monitoring of the power generation system and adjust the power generation system based on the processed data. In alternative embodiments, the computing device of the system can be wholly or partially located at a geographic location remote from the power generation system, and may use a library of data pertaining to multiple power generation systems to adjust the operation of each power generation system. Providing a network of cameras in communication with a system controller can provide greater accessibility and functionality to managers of a power generation system, e.g., by permitting a user to access an application, web-portal, etc, immediately after the cameras have been installed to analyze various portions of the power generation system, and undertake corrective actions, without personally visiting and viewing different portions of the power generation system.

FIG. 1 shows a turbomachine 100, which may be included within a power generation system as discussed elsewhere herein. Turbomachine 100 can include, e.g., a compressor 102 operatively coupled to a turbine component 104 through a shared compressor/turbine shaft 106. Turbomachine 100 is depicted as being in the form of a gas turbine in FIG. 1, but it is understood that other types of machines (e.g., steam turbines, water turbines, etc.) can be substituted for, or used with, gas turbines and/or deployed in the same power generation system in embodiments of the present disclosure. More generally, any machine which includes an embodiment of turbine component 104 can be used, modified, and/or controlled to yield embodiments of the present disclosure as discussed herein. Compressor 102 can be in fluid communication with turbine component 104, e.g., through a combustor assembly 108. Each combustor assembly 108 can include one or more combustors 110. Combustors 110 may be mounted to turbomachine 100 in a wide range of configurations including, but not limited to, being arranged in a can-annular array. Compressor 102 includes a plurality of compressor rotor wheels 112. Compressor rotor wheels 112 include a first stage compressor rotor wheel 114 having a plurality of first stage compressor rotor blades 116 each having an associated airfoil portion 118. Similarly, turbine component 104 includes a plurality of turbine wheel components 120 including one or more rotor wheels 122 having a set of corresponding turbine rotor blades 124.

During operation, an operative fluid such as a combusted hot gas can flow from combustor(s) 110 into turbine component 104. The operative fluid in turbine component 104 can pass over multiple rotor blades 124 mounted on turbine wheel 122 and arranged in a group of successive stages. The first set of turbine blades 124 coupled to wheel 122 and shaft 106 can be identified as a "first stage" of turbomachine 100, with the next set of turbine blades 124 being identified as a "second stage" of turbomachine 100, etc., up to the last set of turbine blades 124 in a final stage of turbomachine 100. The final stage of turbomachine 100 can include the largest size and/or highest radius turbine blades 124 in turbomachine 100. A plurality of respective nozzles (not shown) can be positioned between each stage of turbomachine 100 to further define a flow path through turbomachine 100. The operative fluid flowing over each turbine blade 124 can rotate shaft 106 by imparting thermal and mechanical energy thereto, thereby rotating shaft 106 of turbomachine 100.

Turbomachine 100 may also include one or more auxiliary components such as internal valves 126, e.g., to modulate the operative fluid flow out of and into the direct flow path for various purposes, e.g., to be used in one or more pump/motor sets 128 also included within turbomachine 100. Rotating shaft 106 can generate power by being mechanically coupled to a generator component 130 which converts mechanical energy of shaft 106 into electrical energy for powering devices connected to generator 130. The amount of electrical energy produced by generator 130 can be measured, e.g., in Joules (J) and/or Watts (W) as an amount of work and/or power produced by turbomachine 100. In addition, at least one air source 140 (e.g., a dedicated supply, an ambient air source, etc.) may be in fluid communication with compressor 102. At least one fuel source 142 (e.g., a reserve, supply nozzle, etc.) may be in fluid communication with combustor 110 to provide one or more combustible fuels thereto. Air source(s) 140 and/or fuel source(s) 142 may be in fluid communication with compressor 102 through one or more valves 146 for controlling the amount of fuel, air, and/or other fluids supplied to turbomachine 100 to drive combustion reactions therein. Any one or more of the various components of turbomachine 100 may produce an acoustic output 148, which may be detectable and/or measurable as an acoustic signal produced from a respective component, as discussed herein.

Figure 2:
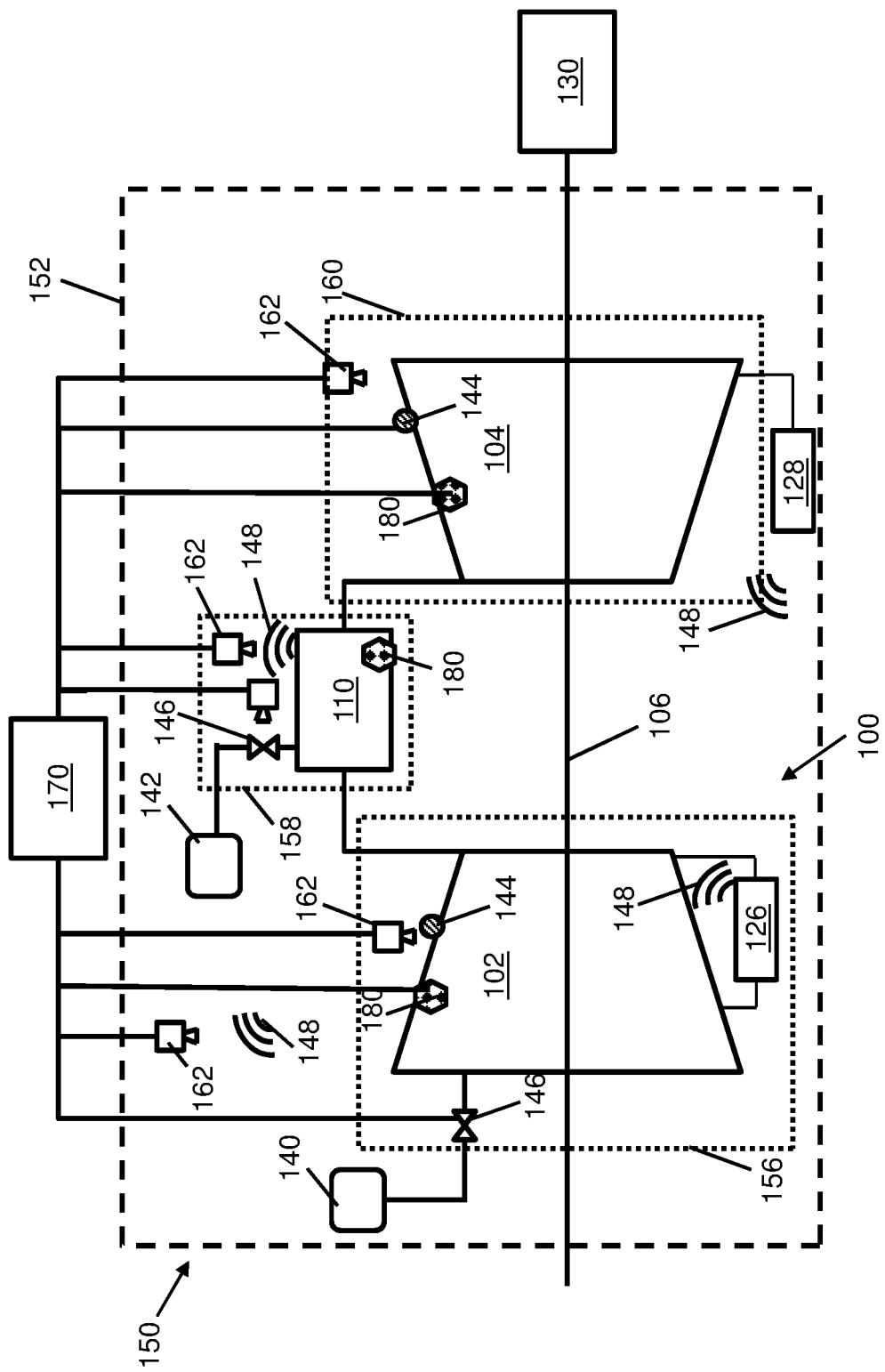
FIG. 2 provides a schematic view of a system according to embodiments of the present disclosure.

Turning to FIG. 2, a system 150 for monitoring a power generation system according to embodiments of the present disclosure is shown. System 150 may be configured to monitor, or may otherwise include, a power generation system 152, which as noted elsewhere herein can include, e.g., combustion based power plants including a fleet of gas turbines and/or other machines therein, or non-combustion based power plants such as a water turbine, steam turbine, solar or wind based power generation system. Power generation system 152 may also include any conceivable combination of combustion based and non-combustion based power generation systems, which may be interconnected or may not be interconnected. Power generation system 152 in some cases may be located at a particular geographic location, with other power generation systems 152 being located at other geographic positions. Regardless of where power generation systems 152 may be located, each power generation system 152 of system 150 may be in communication with one system controller as described herein.

System 150 and power generation system 152 are described herein with power generation system 152 being in the form of a power plant including one or more assemblies therein, such as turbomachine(s) 100 and components thereof (e.g., compressor 102, turbine component 104, combustor 110, valves 126, pump/motor sets 128, etc., hereinafter "component(s) 102, 104, 110, 126, 128"). Although gauges 144 and valves 146 may not be identified collectively with component(s) 102, 104, 110, 126, 128 for the sake of emphasizing gauges 144 and valves 146, it is understood that gauges 144 and valves 146 may also be considered to be components of power generation system 152. Additionally, although component(s) 102, 104, 110, 126, 128, gauges 144, and valves 146 are discussed throughout the present disclosure as an example, it is understood that system 150 can be configured to monitor any number of predetermined components within turbomachine 100 and/or other machines within power generation system 152. Each component 102, 104, 110, 126, 128 of turbomachine 100 within power generation system 152 can be housed in a respective area 156, 158, 160 and/or other areas or sub-areas of power generation system 152 not explicitly identified or described.

Turbomachine 100 is shown by example to include compressor component 102, gauge 144, and valves 126 in first area 156, combustor 110 and valve 146 in second area 158, turbine component 104 and gauge 144 in third area 160 and pump/motor set 128 in a fourth unenclosed or unidentified area. Each area 156, 158, 160 can be separated by architectural features such as partitions, floors, signage, etc., and/or can refer to areas within a shared room, space, building, etc. In some cases, component(s) 102, 104, 110, 126, 128 of one turbomachine 100 may be in close proximity with each other, but may be separated from similar component(s) 102, 104, 110, 126, 128 in other turbomachines. Thus, component(s) 102, 104, 110, 126, 128 shown in FIG. 2 may be part of a single turbomachine 100 or alternatively may each be portions of respective separate turbomachines 100. It is also understood that areas 156, 158, 160 can be defined solely by whether they are illuminated with one or more corresponding cameras 162, e.g., where all components 102, 104, 110, 126, 128 of power generation system 152 are housed in a single room. Areas 156, 158, 160 can include multiple components 102, 104, 110, 126, 128 therein in alternative embodiments.

A group of cameras 162 may be installed in power generation system 152 at positions capable of monitoring one or more components 102, 104, 110, 128, gauges 144, and/or valves 146 of power generation system 152. Each camera 162 may be positioned within, or at a location suitable to visually monitor, respective areas 156, 158, 160 of power generation system 152. As discussed elsewhere herein, each camera 162 can be provided in the form of any currently-known or later-developed visual or audio-visual capturing system and as examples may include fixed or portable devices including conventional cameras, infrared cameras, light filed cameras, acoustic cameras, magnetic resonance imaging (MRI) cameras, and/or any conceivable number or type of image detection instruments. More particularly, each camera 162 can be configured to operate at a position suitable to visually monitor power generation system 152, e.g., through a corresponding electrical and/or mechanical coupling.

Cameras 162 in some cases may be operable to detect the acoustic output of component(s) 102, 104, 110, 128, gauges 144, and/or valves 146 of power generation system 152. In this case, camera(s) 162 may include a microphone or other acoustic sensing device. Cameras 162 may also include a communications mechanism, for example ethernet over power, WIFI or cellular, to transmit measured data outside of camera 162, or more generally outside power generation system 152. Camera(s) 162 can be configured to detect acoustic outputs 148 by converting them into an acoustic signature. As described herein, an "acoustic output," or alternatively an "acoustic signature," refers to a one or more sound waves detected with camera(s) 162 generated by one or more respective components 102, 104, 110, 126, 128, gauge(s) 144, and/or valve(s) 146, including ultrasonic emissions (i.e., those having a frequency of at least approximately twenty kilohertz (kHz) and above). Acoustic outputs 148 can be represented analytically as a singular or composite sound wave having varied frequencies, amplitudes, and/or other properties based on the underlying source(s) of acoustic output 148. Each acoustic output 148 can originate from one or more sources in power generation system 152 during operation, such that several acoustic outputs 148 detected within power generation system 152 each have a set of frequencies, wavelengths, amplitudes, phases, etc., when plotted as a sound wave.

System 150 may include a system controller 170 (alternatively, "computing device" or simply "controller") communicatively coupled to one or more cameras 162 to perform various functions, including the monitoring of components 102, 104, 110, 126, 128, gauges 144, and/or valves 146 of power generation system 152 as described herein. System controller 170 can generally include any type of computing device capable of performing operations by way of a processing component (e.g., a microprocessor) and as examples can include a computer, computer processor, electric and/or digital circuit, and/or a similar component used for computing and processing electrical inputs. Example components and operative functions of system controller 170 are discussed in detail elsewhere herein. One or more cameras 162 may also include an integrated circuit to communicate with and/or wirelessly transmit signals to system controller 170.

One or more sensors 180 may be in communication with system controller 170 and can be positioned, e.g., within corresponding areas of turbine component 104 where operating fluids can be measured or examined including without limitation: components 102, 104, 110, 126, 128, gauges 144, and/or valves 146. Each sensor 180 can be configured to determine (e.g., by direct measurement and/or calculation from related variables) various quantities such as the input conditions, output conditions, fluid path conditions (e.g., the temperature, pressure, and/or flow rate of operative fluids within a portion of power generation system 152), etc., to model and affect the performance of power generation system 152.

A variety of sensors can be used in embodiments of the present disclosure. Sensor(s) 180 can be in the form of temperature sensor(s), flow sensor(s), pressure sensor(s), and/or other devices for evaluating the properties of a component or sub-component, operative fluid(s) within a component or sub-component, etc., at a particular location. Sensor(s) 180 in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Where one or more sensors 180 include temperature sensors, the temperature of fluid(s) passing through the location of sensor(s) 180 can be measured and/or converted into an electrical signal or input relayed to system controller 170. Sensor(s) 180 in the form of pressure sensors can include barometers, manometers, tactile pressure sensors, optical pressure sensors, ionizing pressure sensors, etc. For calculating flow rate and/or other kinetic properties of the operative fluid, sensor(s) 180 can include, e.g., air flow meters, mass flow sensors, anemometers, etc.

Sensor(s) 180 may also derive one or more parameters from other measured quantities, e.g., temperature, pressure, flow rate, etc. These measured quantities, in turn, can be measured at multiple positions of power generation system 152 and applied to mathematical models of fluid flow through a particular component, e.g., via system controller 170. In this case, sensor(s) 180 can include components for measuring variables related to temperature and processing components (e.g., computer software) for prediction and/or calculating values of temperature or other metrics based on the related variables. In general, the term "calculating" in the context of sensor(s) 180 refers to the process of mathematically computing a particular value by direct measurement, predictive modeling, derivation from related quantities, and/or other mathematical techniques for measuring and/or finding a particular quantity. In any event, the conditions measured by each sensor(s) 180 can be indexed, tabulated, etc., according to a corresponding time of measurement. As is discussed elsewhere herein, system controller 170 can act as a "pseudo-sensor" for calculating (e.g., by estimation or derivation) one or more operating conditions at positions within power generation system 152 which do not include sensor(s) 180.

In some cases, sensor(s) 180 may take the form of an energy sensor for measuring, e.g., an energy output from various components of power generation system 152. In this case, sensor(s) 180 can generally be embodied as any currently-known or later-developed instrument for measuring the energy produced by power generation system 152 and/or generator 130 including without limitation, a current sensor, a voltage detector, a magnetometer, a velocity sensors configured to measure a rotation of shaft 106 (including, e.g., optical-based sensors, positional sensors, capacitive sensors, tachometers, etc.), and/or other types of sensors for calculating an amount of produced energy. Regardless of the embodiment(s) used, sensor(s) 180 can be communicatively connected (e.g., electrically and/or wirelessly) to system controller 170 to calculate an energy output from various portions of power generation system 152. In addition, the energy output detected with sensor(s) 180 can be tabulated or otherwise indexed by time of measurement, such that the calculated energy output(s) can be cross-referenced in system controller 170 to conditions calculated with sensor(s) 180. System controller 170 additionally may calculate actual or projected energy outputs from power generation system 152 which correspond to a given set of input conditions, output conditions, etc., calculated with sensor(s) 180.

Figure 3:
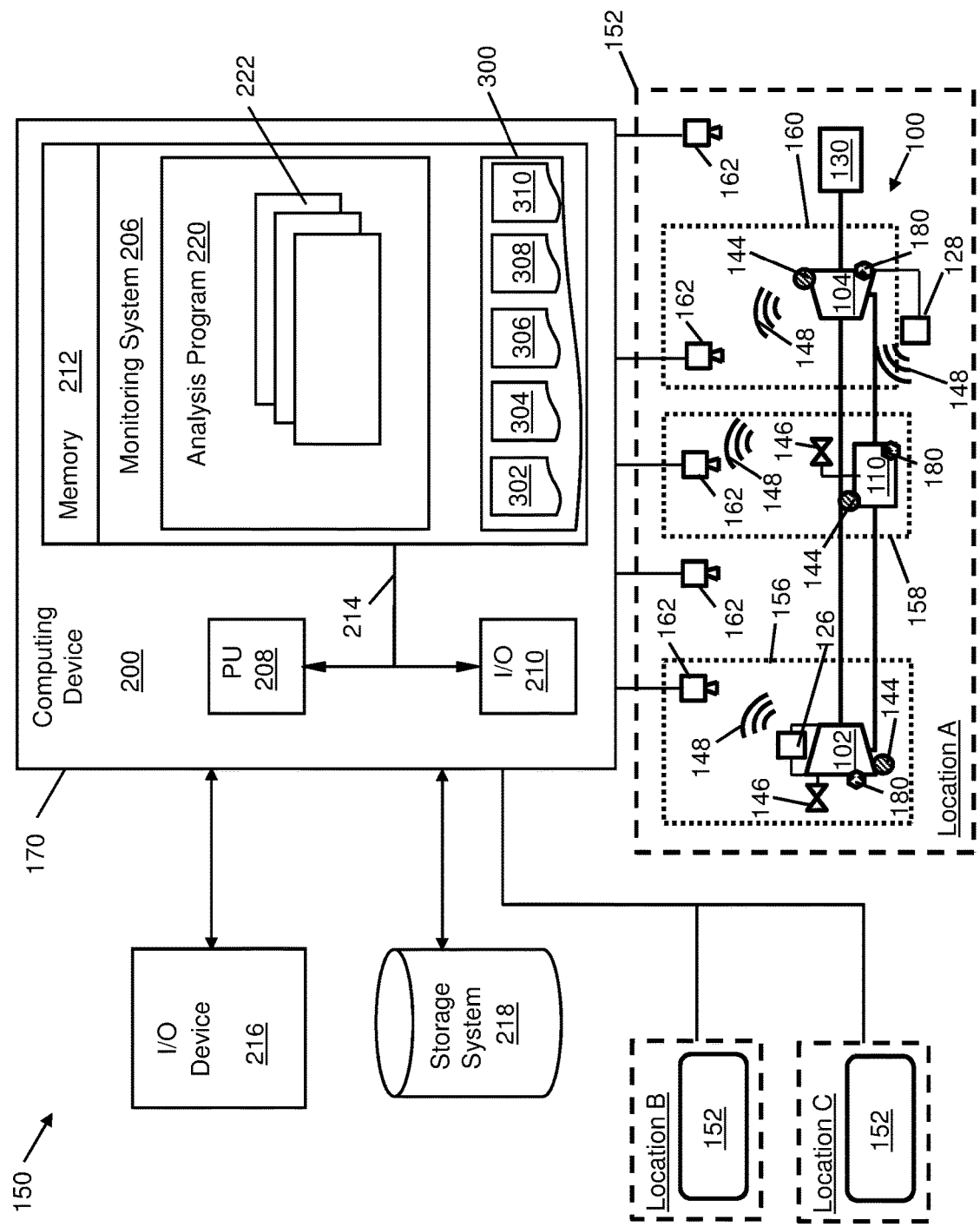
FIG. 3 provides a schematic view of an illustrative environment including a computing device for implementing a system according to embodiments of the present disclosure.

To further illustrate the operational features and details of system 150, an illustrative embodiment of system controller 170 is discussed herein. Referring to FIGS. 2 and 3 together, an example embodiment of system 150 and system controller 170 and sub-components thereof is illustrated with a simplified depiction of one power generation system 152. In particular, system 150 can include system controller 170, which in turn can include a monitoring system 206. The configuration shown in FIG. 3 is one embodiment of a system for monitoring power generation system(s) 152 by visually monitoring a component 102, 104, 110, 126, 128, gauge 144, and/or valve 146. System 150 in some cases may be capable of interacting with multiple distinct power generation systems 152.

System controller 170 may be implemented as a cloud computing environment, an on-premises ("on-prem") computing environment, or a hybrid computing environment. Cloud computing environments typically employ a network of remote, hosted servers to manage, store and/or process data, instead of personal computers or local servers as in an on-prem computing environment. A cloud computing environment includes a network of interconnected nodes, and provides a number of services, for example by hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-prem computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-prem computing environments in a hybrid configuration.

In still further examples, each power generation system 152 may be positioned at a distinct geographic location. For example, one power generation system 152 is shown to be located at "Location A," while two other power generation systems 152 are shown to be in communication with system controller 170 but located at "Location B" and "Location C," respectively. Location A may represent, e.g., a location in North America, while Location B and Location C may represent locations at any other part of the world (including, e.g., other continents such as Africa and Australia). In this manner, one system controller 170 or combination of system controllers 170 may together or separately manage a worldwide network of power generation systems 152. In some cases, system controller(s) 170 being in communication with power generation systems 152 at multiple locations may allow system 150 to include machine learning features, e.g., using data obtained from power generation systems(s) 152 at Location B and Location C to control power generation system 152 at Location A.

As discussed herein, system controller 170 can extract data obtained from cameras 162 visually monitoring components 102, 104, 110, 126, 128, gauges 144, and/or valves 146 to monitor power generation system 152. For ease of illustration, several connections between component(s) 102, 104, 110, 126, 128, gauge(s) 144, and/or valve(s) 146 are omitted in FIG. 3 (but shown in FIG. 2) solely for clarity of illustration. Furthermore, embodiments of the present disclosure can perform these functions automatically and/or responsive to user input by way of an application accessible to a user or other computing device. Such an application may, e.g., exclusively provide the functionality discussed herein and/or can combine embodiments of the present disclosure with a system, application, etc., for remotely controlling camera(s) 162. Embodiments of the present disclosure may be configured or operated in part by a technician, system controller 170, and/or a combination of a technician and system controller 170. It is understood that some of the various components shown in FIG. 3 can be implemented independently, combined, and/or stored in memory for one or more separate computing devices that are included in system controller 170. Further, it is understood that some of the components and/or functionality may not be implemented, or additional schemas and/or functionality may be included as part of monitoring system 206.

System controller 170 can include a processor unit (PU) 208, an input/output (I/O) interface 210, a memory 212, and a bus 214. Further, system controller 170 is shown in communication with an external I/O device 216 and a storage system 218. Monitoring system 206 can execute an analysis program 220, which in turn can include various software modules 222 configured to perform different actions, e.g., a calculator, a determinator, a comparator, an image processing algorithm, etc. The various modules 222 of monitoring system 206 can use algorithm-based calculations, look up tables, and similar tools stored in memory 212 for processing, analyzing, and operating on data to perform their respective functions.

In general, PU 208 can execute computer program code to run software, such as control system 206, which can be stored in memory 212 and/or storage system 218. While executing computer program code, PU 208 can read and/or write data to or from memory 212, storage system 218, and/or I/O interface 210. Bus 214 can provide a communications link between each of the components in system controller 170. I/O device 216 can comprise any device that enables a user to interact with system controller 170 or any device that enables system controller 170 to communicate with the equipment described herein and/or other computing devices. I/O device 216 (including but not limited to keyboards, displays, pointing devices, etc.) can be coupled to system controller 170 either directly or through intervening I/O controllers (not shown).

Memory 212 can also include various forms of data stored in a library 300 for quantifying one or more operational parameters of power generation system 152, which may pertain to and/or components 102, 104, 110, 126, 128, gauges(s) 144, and/or valves 146. As discussed elsewhere herein, system controller 170 can monitor power generation 152 via camera(s) 162 through operating steps which in turn can rely upon various forms of data in library 300. To exchange data between computer system 200 and cameras 162, computer system 200 can be in communication with camera(s) 162 through any currently known or later developed type of communications network. For example, computer system 200 can be embedded at least partially within camera 162 as a component thereof, or can be embodied as a remotely located device such as a tablet, PC, smartphone, etc., in communication with camera(s) 162 through any combination of wireless and/or wired communication protocols. To monitor power generation system 152, analysis program 220 of monitoring system 206 can store and interact with library 300 according to processes of the present disclosure.

Library 300 can be organized into a group of fields. For example, library 300 can also include a gauge measurement field 302 for storing measurements detected from gauge(s) 144 via camera(s) 162. Gauge measurement field 302 can include relative and/or absolute values for one or more operational parameters of power generation system 152, e.g., fluid pressure, fluid temperature, fluid flow rate, blade speed, blade temperature, and/or any conceivable parameter capable of being measured and reported via gauge(s) 144 mounted on portions of power generation system 152.

Other forms of library 300 may include, e.g., a heat distribution field 304 for recording the thermal properties of various components 102, 104, 110, 126, 128, gauge(s) 144, and/or valve(s) 146 of power generation system 152. The data included in heat distribution field 304 may be recorded via camera(s) 162 in embodiments where camera(s) 162 are capable of thermal imaging (e.g., by including components for detecting infrared light). In one example, data in heat distribution field 304 may take the form of a plot of temperatures on a particular component relative to locations on the component. In a further example, data recorded in heat distribution field 304 may take the form of a two-dimensional temperature map in which each coordinate in a two-dimensional map of one component is correlated to its temperature at a particular time. In a more simplified example, heat distribution field 304 may include a time-indexed table for a group (i.e., two or more) sample locations of a component correlated to the temperature of the component at the group of sample locations.

Library 300 in addition may include a valve position field 306 for recording the position of one or more valve(s) 126, 146 of power generation system 152. Detected valve positions stored in valve position field 306 may be detectable, e.g., using camera(s) 162 at locations with a view of one or more valve(s) 126, 146 for controlling fluid flow in part of power generation system 152. Valve position field 306 may be organized to include a flow rate through a portion of power generation system 152 caused by valve(s) 126, 146 being in the position(s) detected by camera(s) 162.

Library 300 may also include, e.g., an acoustic profile field 308 for recording a set of acoustic outputs originating from or otherwise associated with component(s) 102, 104, 106, 126, 128, gauge(s) 144, and/or valve(s) 126, 146. As noted herein, acoustic outputs 148 from various with component(s) 102, 104, 106, 126, 128, gauge(s) 144, and/or valve(s) 126, 146 may be detectable via camera(s) 162. The detected acoustic output(s) 146 in some cases may be converted into acoustic signatures and/or other representations capable of being stored in library 300. The acoustic profile(s) stored in acoustic profile field 308 may be used in some embodiments to detect an acoustic disturbance in power generation system 152.

A threshold field 310 can include one or more tolerance windows for determining whether any detected operating conditions (indicated, e.g., by gauge measurements, heat distributions, valve positions, acoustic profiles, etc.) in library 300 require adjusting of power generation system 152. More specifically, threshold field 310 may include operating data pertaining to past operation of power generation system 152, and/or other relevant operating data pertaining to the operation of other power generation systems 152 (e.g., those located at Location B and/or Location C). In still further embodiments, threshold field 310 may additionally or alternatively include projected operating data for power generation system 152 or projected operating data for other power generation systems 152 (e.g., those located at Location B and/or Location C). In the case of projected operating data, modules 222 may use various forms of input data (e.g., past operation, selected operating settings, measurements from present operation, etc.) to predict future values of one or more operating parameters (e.g., pressures, temperatures, flow rate, power generated, etc.) of power generation system 152. Threshold field 310 may be expressed as one or more sets of boundary values for operating parameters such as temperature, pressure, flow rate, acoustic frequencies and wavelengths, for automatic monitoring of power generation system 152. As discussed herein, system controller 170 may initiate various adjustments to power generation system 152 and its operation upon any operating parameter, or combination of operating parameters, exceeding corresponding thresholds in threshold field 310. Each entry of fields 302, 304, 306, 308, 310 can be indexed relative to time such that a user can cross-reference information of each field 302, 304, 306, 308, 310 in library 300. It is also understood that library 300 can include other data fields and/or other types of data therein for evaluating the condition of components 102, 104, 110, 126, 128, gauge(s) 144, and/or valve(s) 126, 146 of power generation system 152.

Library 300 can also be subject to preliminary processing by modules 222 of analysis program 220 before being recorded in one or more of fields 302, 304, 306, 308, 310. For example, one or more modules 222 can apply a set of rules to remove false readings from field(s) 302, 304, 306, filter inconsequential noise from acoustic signature(s) 166 in field 308, etc. Such rules and/or other criteria may be generated from the manufacturer's manufacturing specification of these components and/or data pertaining to other power generation system(s) 152. For example, compressor 102 may generate thermal energy and acoustic outputs related to the number of rotating blades of various stages. In the case of combustor 110, the possible resonant frequencies, as related to the type and geometry of combustor 110, operating conditions, type(s) of fuels combusted, etc., may be specified at the time of manufacture. Such analyses can determine criteria such as the amplitude limits associated with data field 302, 304, 306, 308 being analyzed with respect to threshold field 310.

System controller 170 can comprise any general purpose computing article of manufacture for executing computer program code installed by a user (e.g., a personal computer, server, handheld device, etc.). However, it is understood that system controller 170 is only representative of various possible equivalent computing devices that may perform the various process steps of the disclosure. In addition, system controller 170 can be part of a larger system architecture operable to evaluate one or more power generation systems 152.

To this extent, in other embodiments, system controller 170 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, system controller 170 may include a program product stored on a computer readable storage device, which can be operative to automatically monitor power generation system 152 when executed.

Figure 4:
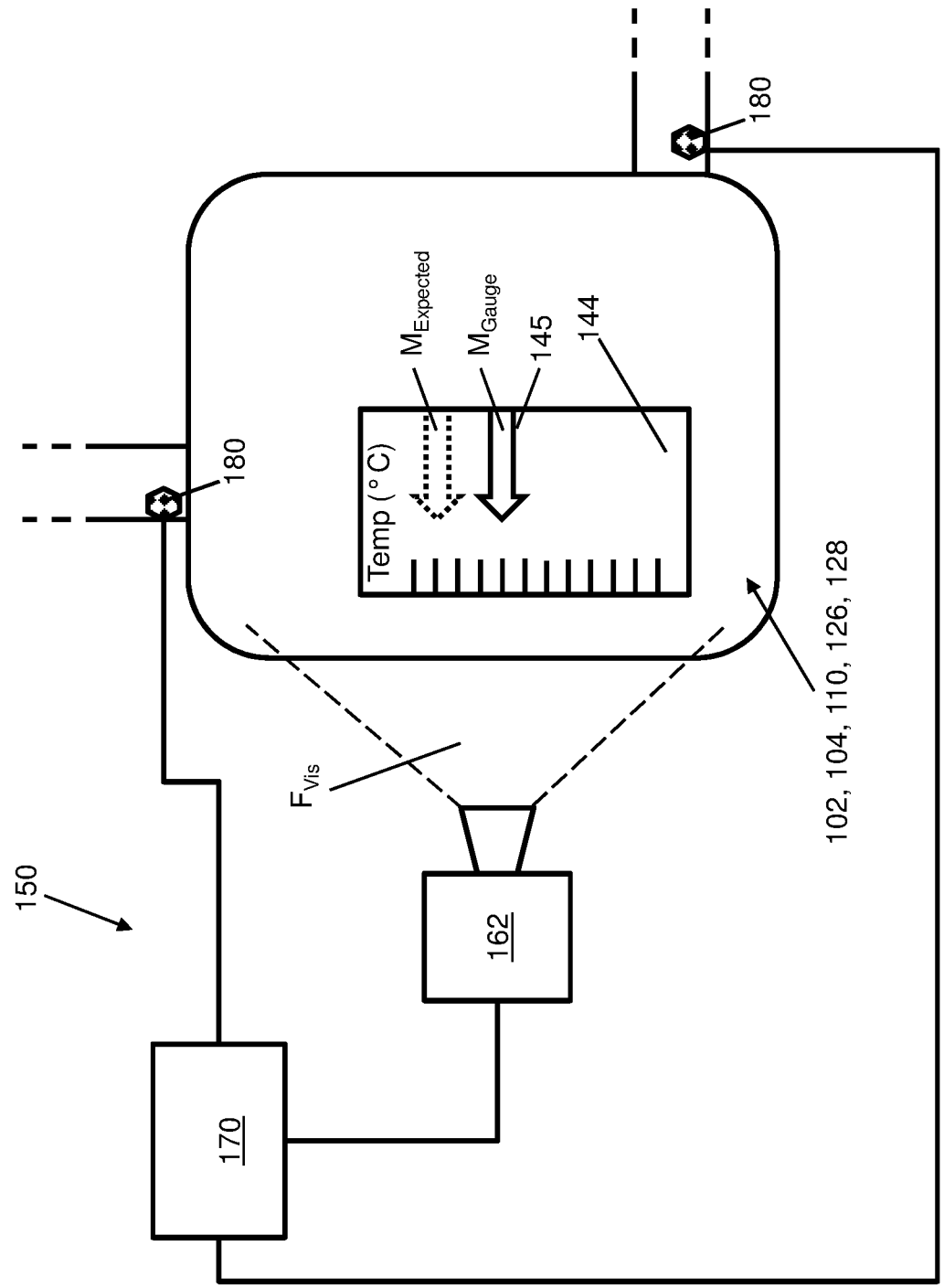
FIG. 4 provides an expanded schematic view of a system controller and camera for visually monitoring a gauge according to embodiments of the present disclosure.

Turning to FIG. 4, an expanded schematic view of system controller 170 and camera 162 for monitoring gauge 144 is shown. Camera(s) 162 may have a field of vision $F_{vis}$ sized for visual monitoring of or more component(s) 102, 104, 110, 126, 128. At least one component 102, 104, 110, 126, 128 visually monitored with camera 162 may include a gauge 144 for measuring at least one operational parameter.

In the example of FIG. 4, gauge 144 is a temperature gauge for measuring an internal temperature of the component(s) 102, 104, 110, 126, 128 under analysis. Gauge 144 may display a gauge measurement $M_{Gauge}$ via one or more measuring devices. Gauge 144 may include an indicator 145, e.g., a needle in simplistic implementations, a screen in digital implementations, and/or any conceivable instrument for communicating parameter(s) measured with gauge 144 in various other embodiments. In the example of FIG. 4, indicator 145 is shown as an arrow on gauge 144 indicating the temperature within component 102, 104, 110, 126, 128 under analysis. During operation, various events may cause gauge 144 and/or indicator 145 to display an inaccurate measurement, e.g., miscalibration of gauge 144, wear or damage to intervening components which measure the operational parameter(s) displayed by gauge 144, indicator 145 being stuck or exhibit a slight jitter indicating that the gauge is operating normally or exhibit extreme jitter indicating that the gauge is malfunctioning. As discussed herein, system controller 170 may use sensor(s) 180 to derive an expected value $M_{Expected}$ of the operational parameter(s) measured with gauge(s) 144, and implement various processes to detect and correct differences between gauge measurement $M_{Gauge}$ and expected value $M_{Expected}$.

Figure 5:
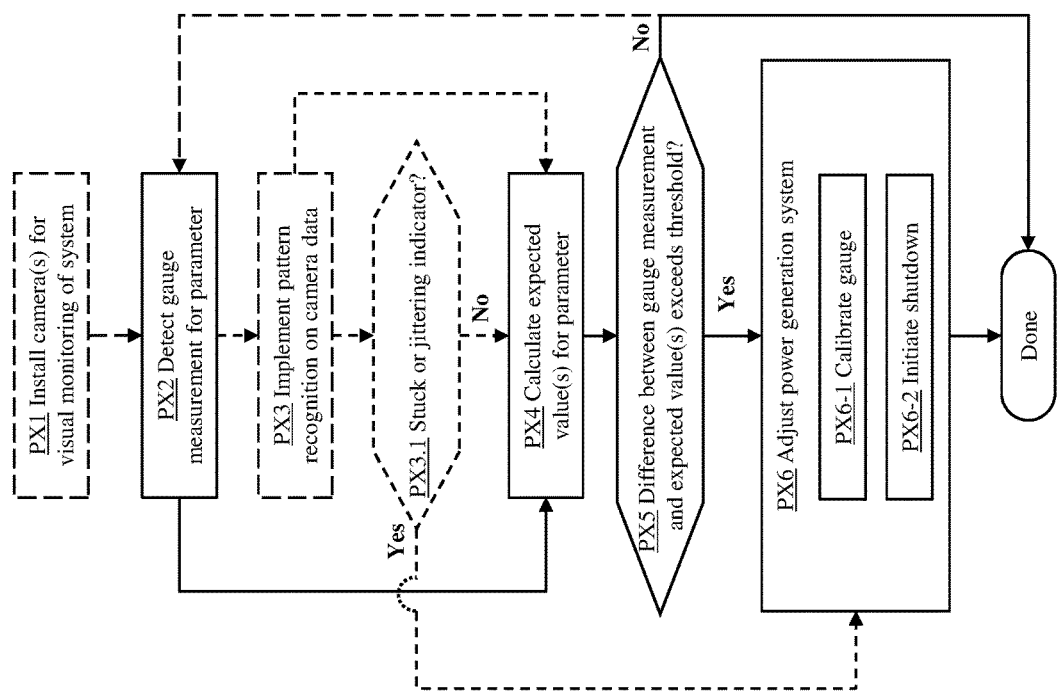
FIG. 5 provides an illustrative flow diagram of a method according to embodiments of the present disclosure.

Referring to FIGS. 3-5 together, embodiments of the disclosure provide a method to control power generation system(s) 152 based on visual monitoring of gauge(s) 144 via camera(s) 162. Processes PX1-PX6 are shown by example in FIG. 5 as being implemented separately from other processes according to the disclosure. The example processes shown in FIG. 7 (illustrating process PY1-PY8) and FIG. 9 (illustrating process PZ1-PZ6), and discussed elsewhere herein, may be implemented sequentially and/or simultaneously with those shown in FIG. 5. It is understood that any or all of the various processes discussed herein optionally may be combined and implemented together substantially as a set of combined processes or sub-processes wherever possible. The example process flows shown in FIGS. 5, 7, and 9 and described herein thus provide an illustrative set of examples for implementing embodiments of the present disclosure. In addition, the process flows illustrated in FIGS. 5, 7, and 9 may be implemented, e.g., by way of system controller(s) 170 including computing device(s) 200 communicatively connected to cameras 162 configured to monitor various portions of power generation system 152. It is understood that the various processes described herein can be implemented in real time during operation of turbomachine 100 and/or can be implemented as part of a historical analysis of turbomachine 100 (e.g., a post-failure or post-servicing analysis).

An initial process PX1 may include installing one or more camera(s) 162 within power generation system 152. Camera(s) 162 can be installed by a party implementing the various process steps described herein and/or another party before processes of the present disclosure are implemented. As such, process PX1 is shown in phantom to indicate that process PX1 may be a preliminary step which occurs before other processes according to the present disclosure. The installing of cameras in process PX1 may include, e.g. electrically and mechanically coupling each camera 162 to a mounting component or fixture provided within power generation system 152. A location for each camera 162 may be selected such that at least one camera 162 may visually monitor gauge(s) 144 and gauge measurement(s) $M_{Gauge}$ (FIG. 4) displayed thereon. The installation process may include, e.g., operating camera(s) 162 in a test mode to adjust field of vision $F_{vis}$ (FIG. 4) to determine whether the desired gauge(s) 144 will be visually monitored. A user may operate camera(s) 162 manually to determine whether each gauge 144 to be monitored appears in the field view of the installed camera(s) 162. The subsequent visual monitoring of gauge(s) 144 may be implemented automatically by system controller 170, and without user intervention, as described herein.

At process PX2, each camera 162 may operate independently of power generation system 152 to detect gauge measurement(s) being displayed by gauge(s) 144. Process PX2 thus may include, e.g., recording or otherwise obtaining photographic or video footage of gauge(s) 144 at a particular time, with the measurement(s) of each gauge 144 being visible. In some cases, process PX2 may include continuous video monitoring of power generation system 152. In other cases, process PX2 may include burst photographic capturing of gauge(s) 144 at particular intervals, e.g., capturing one image per predetermined interval (e.g., five-minute span) of operation. The detecting of gauge measurements in process PX2 may yield a photographic or video record of temperatures, pressures, generated energy, flow rates, etc., for a particular component 102, 104, 126, 128 in power generation system 152. In conventional settings, a user or inspector would manually examine each gauge 144 to record various operating parameters. In embodiments of the disclosure, system controller 170 detects the measurement displayed on each gauge 144 automatically via camera(s) 162. The conversion from records provided by camera(s) 162 to gauge measurements storable, e.g., in gauge measurement field 302 of library 300 may be implemented via any currently known or later developed method for converting portions of an image to data.

Turning to process PX3, depicted in phantom to indicate an optional procedure, the method may include implementing pattern recognition on images or video captured by camera(s) 162 to isolate or extract gauge measurement(s) included therein. According to an example, modules 222 of computing device 200 may include one or more algorithms, look-up tables, mathematical formulas, etc., capable of automatically identifying one or more portions of an image, or video, as illustrating a gauge measurement. In a more specific example, at least one gauge 144 in the form of a temperature gauge may include indicator 145 (e.g., an arrow as shown in FIG. 4), or other visually identifiable component, e.g., a contrasting-colored measuring indicator 145 such as a red needle against a white surface for distinguishing gauge(s) 144 from remaining portions of the same image or video of camera 162. Camera 162 and/or system controller 170 additionally may include physical image filters and/or similar tools for isolating irrelevant sections of an image or video feed to better identify measurements displayed on gauge(s) 144. Gauge measurements detected in PX2, and PX3 where applicable, may be stored in gauge measurement field 302 of library 300.

Methods according to the disclosure optionally may include an additional process PX3.1 of using visual pattern recognition to identify whether indicator 145 of gauge 144 is stuck or jittering. Indicator 145 being "stuck" refers to a situation where indicator 145 is at least partially non-responsive to changes in one or more parameters being measured via gauge(s) 144. In some cases, indicator 145 being stuck may refer to a situation where indicator 145 is in a fixed position where a minor amount of movement or jitter would be expected. Indicator 145 undergoing "jittering" refers to a situation where indicator 145 fluctuates over a range of possible measurements in a manner that is inconsistent with actual fluctuations in the parameter being measured. Indicators 145 which jitter are thus another possible source of inaccuracy in the monitoring of parameter(s) with gauge(s) 144. To account for such possibilities, the pattern recognition algorithm may identify visually distinct shapes, colors, and/or other properties in an image of gauge 144 to detect whether indicator 145 is stuck (i.e., not moving enough) or jittering (i.e., moving too much) based on other data, e.g., data obtained from sensor(s) 180, or historical data of where indicator 145 has been position over a given time period. In the event that a stuck or jittering indicator 145 is detected (i.e., "Yes" at process PX3.1), the method may proceed to process PX6 of adjusting power generation system 152 as discussed elsewhere herein. Where indicator 145 does not appear to be jittering or stuck based on the pattern recognition algorithm (i.e., "No" at process PX3.1), the method may proceed to process PX4 as discussed below.

The method may continue by implementing process PX4 of calculating one or more expected values for operational parameters measured by gauge 144. Embodiments of the disclosure, in some cases, may detect an error in one or more gauges 144. For example, embodiments of the disclosure are operable to detect, e.g., whether one or more gauges 144 are measuring inaccurately, whether one or more gauges 144 have ceased functioning, whether one or more mechanical components of any gauge 144 are malfunctioning, etc. Process PX4 includes using other data, e.g., detected by sensor(s) 180 or included in library 300, to calculate an expected value of the operational parameter being measured with gauge(s) 144. The calculating in process PX4 may implemented, e.g., using modules 222 of analysis program 220, or by direct reference to one or more sets of data included in library 300. In an example, sensor(s) 180 may detect a temperature of e.g., approximately 1150 degrees Celsius (° C.) within turbine component 104 and an associated energy output of approximately fifty megawatts (MW). Modules 222 of analysis program 220 may then derive other operational parameters, e.g., an inlet temperature of 1200° C. in turbine component 104, an outlet temperature of 1070° C. in turbine component 104, by application of predetermined correlations, material properties of turbomachine 100, etc. The expected value calculated in process PX4 may thus indicate one or more measurements that would be displayed on an ideal (i.e., properly operating) gauge 144.

Continuing to process PX5, methods according to the disclosure include analyzing the difference between the gauge measurement(s) for an operating parameter, as detected in processes PX2, PX3, and the expected value(s) of the same parameter as calculated in process PX4. Embodiments of the disclosure can thus determine whether the measurement(s) displayed on gauge(s) 144 are consistent the expected value(s) for the same parameters. Process PX5 may include determining whether a difference between the gauge measurement(s), e.g., as expressed in gauge measurement field 302, differ from the operating parameter's expected values by at least a predetermined threshold. The predetermined threshold may be stored in library 300 within threshold field 310, as discussed elsewhere herein. In an illustrative example, the expected value of a parameter as calculated in process PX5 may be an outlet temperature of approximately 1200° C. within turbine component 104. However, the gauge measurement displayed on gauge 144 at the same moment of time may be, e.g., approximately 1150° C. Threshold field 310 may specify a threshold value of 25° C. difference between measured and expected values for this parameter, e.g., indicating that each gauge cannot misrepresent its respective operating temperature by more than a 25° C. difference. In cases where the difference between the gauge measurement of an operating parameter, and its expected value, exceeds the predetermined threshold (i.e., "Yes" at process PX5), the method may proceed to process PX6 of adjusting power generation system 152, e.g., by recalibrating the gauge or shutting down power generation system 152 for servicing. In cases where the difference between the gauge measurement and its expected value is within the predetermined threshold (e.g., gauge 144 displays an inlet temperature between approximately 1175° C. and approximately 1225° C.; "No" at process PX5), the method may conclude ("Done"). Where continuous monitoring of power generation system 152 is desired, the flow may return to process PX2 of detecting another gauge measurement from the same gauge 144 or a different gauge 144.

In cases where process PX6 of adjusting power generation system 152 is implemented, the method may include any one or more sub-processes (e.g., processes PX6-1, PX6-2 shown in FIG. 4). The adjusting of power generation system 152 in process PX6 may be undertaken automatically via system controller 170, or in some cases may be undertaken with the aid of one or more operators, servicers, etc., of power generation system 152. In still further examples, system controller 170 may implement the adjusting in process PX6 substantially automatically, with an operator or servicer of power generation system 152 serving only to verify the results of the adjusting after it concludes. In an example sub-process PX6-1, embodiments of the disclosure may include calibrating or re-calibrating (simply "calibrating" hereafter) gauge(s) 144 to display the correct measurement of a given operating parameter. The calibrating in process PX6-1 may include, e.g., updating software on gauge(s) 144, mechanically adjusting one or more sub-components of gauge(s) 144 (e.g., by adjusting a transducer, tare settings, component dimensions, etc.) to improve the accuracy of gauge(s) 144.

In another example, gauge(s) 144 may incorrectly measure one or more operating parameters as a result of, e.g., being improperly installed, in the wrong location, having one or more defective parts, and/or being at the end of its useful life. In such cases, component(s) 102, 104, 126, 128 and/or gauge(s) 144 may require servicing. To initiate servicing of 102, 104, 126, 128 and/or gauge(s) 144, embodiments of the disclosure may include initiating a shutdown of power generation system 152 in process PX6-2, e.g., via system controller 170. To initiate a shutdown, system controller 170 may directly command one or more component(s) 102, 104, 126, 128 to transition into a shutdown mode, cease operating altogether, etc. In further examples, system controller 170 may sound an alarm, alert, or other indicator to initiate a shutdown of power generation system 152, or command another controller (not shown) to cease further operation of power generation system 152. It is understood that process PX6 may include various other additional or alternative sub-processes for adjusting power generation system 152 to correct the measurement(s) displayed on gauge(s) 144.

Figure 6:
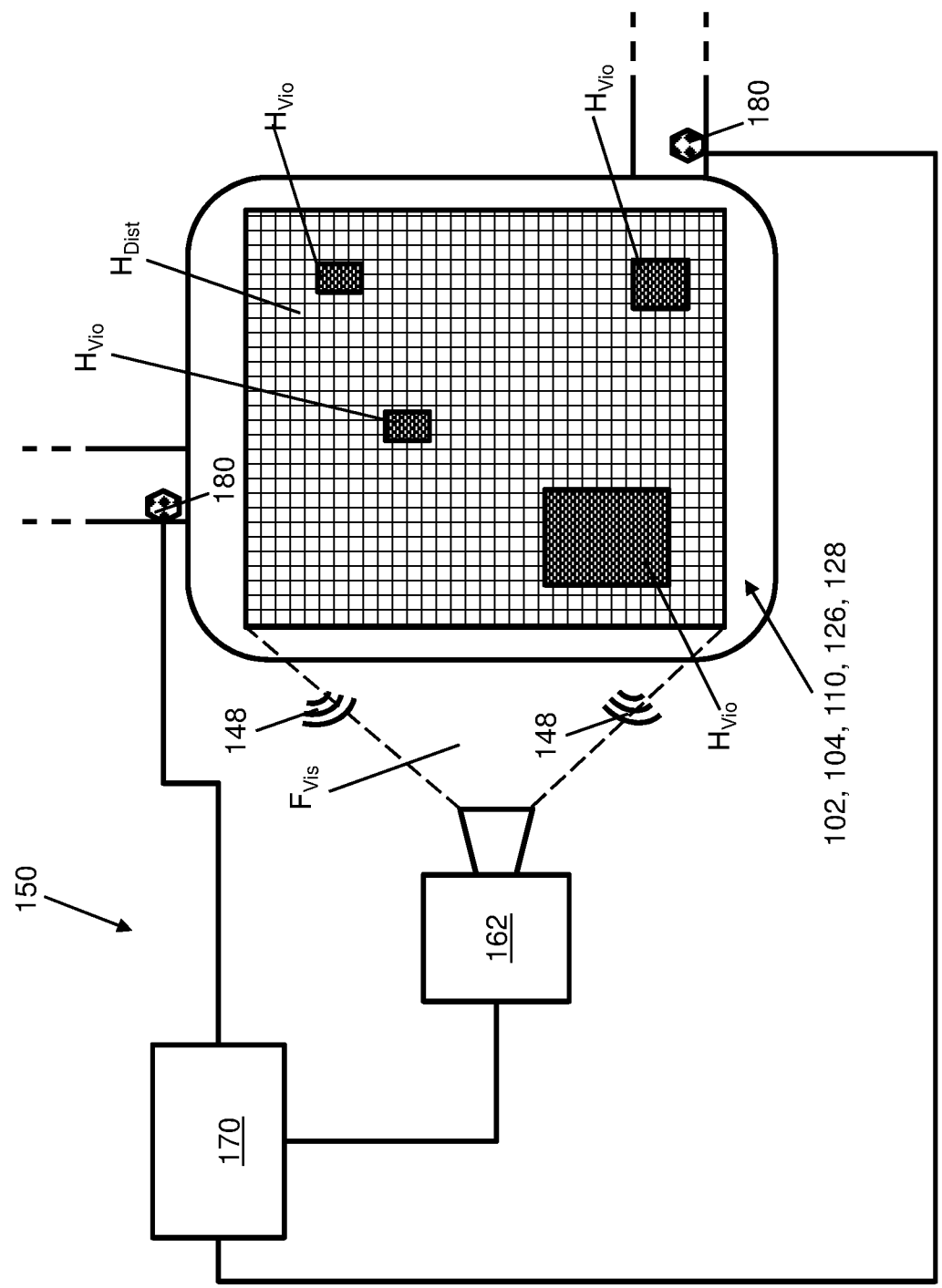
FIG. 6 provides an expanded schematic view of a system controller and camera for visually monitoring a heat distribution and acoustic output of a component according to embodiments of the present disclosure.

Referring now to FIG. 6, an expanded schematic view of system controller 170 and camera 162 for visually monitoring the thermal characteristics of component(s) 102, 104, 110, 126, 128 is shown. The example process flow shown in FIG. 6 may also be implemented to monitor acoustic characteristics, as discussed elsewhere herein. Camera(s) 162 may have a field of vision $F_{vis}$ sized for visual monitoring of at least a portion of component(s) 102, 104, 110, 126, 128 susceptible to thermal variability and/or acoustic disruptions. In an example, camera(s) 162 may include an infrared camera capable of detecting heat in the form of infrared light emitted from component(s) 102, 104, 110, 126, 128 within field of vision $F_{vis}$. In the example of FIG. 6, system controller 170 may be operable to generate a heat distribution $H_{Dist}$ for visualizing thermal properties of component(s) 102, 104, 110, 126, 128 under analysis. In the example of FIG. 6, heat distribution $H_{Dist}$ may take the form of a two-dimensional coordinate map for identifying locations which exceed a threshold temperature. Within heat distribution $H_{Dist}$, locations which exceed a threshold temperature may be separately identified as violating regions $H_{Vio}$, and the presence of heat violating regions $H_{Vio}$ may require, e.g., shutting down power generation system 152 (FIGS. 1-3) and/or servicing component(s) 102, 104, 110, 126, 128. In some cases, system controller 170 may use sensor(s) 180 in combination with camera(s) 162 to generate heat distribution $H_{Dist}$ for component(s) 102, 104, 110, 126, 128 under analysis.

Figure 7:
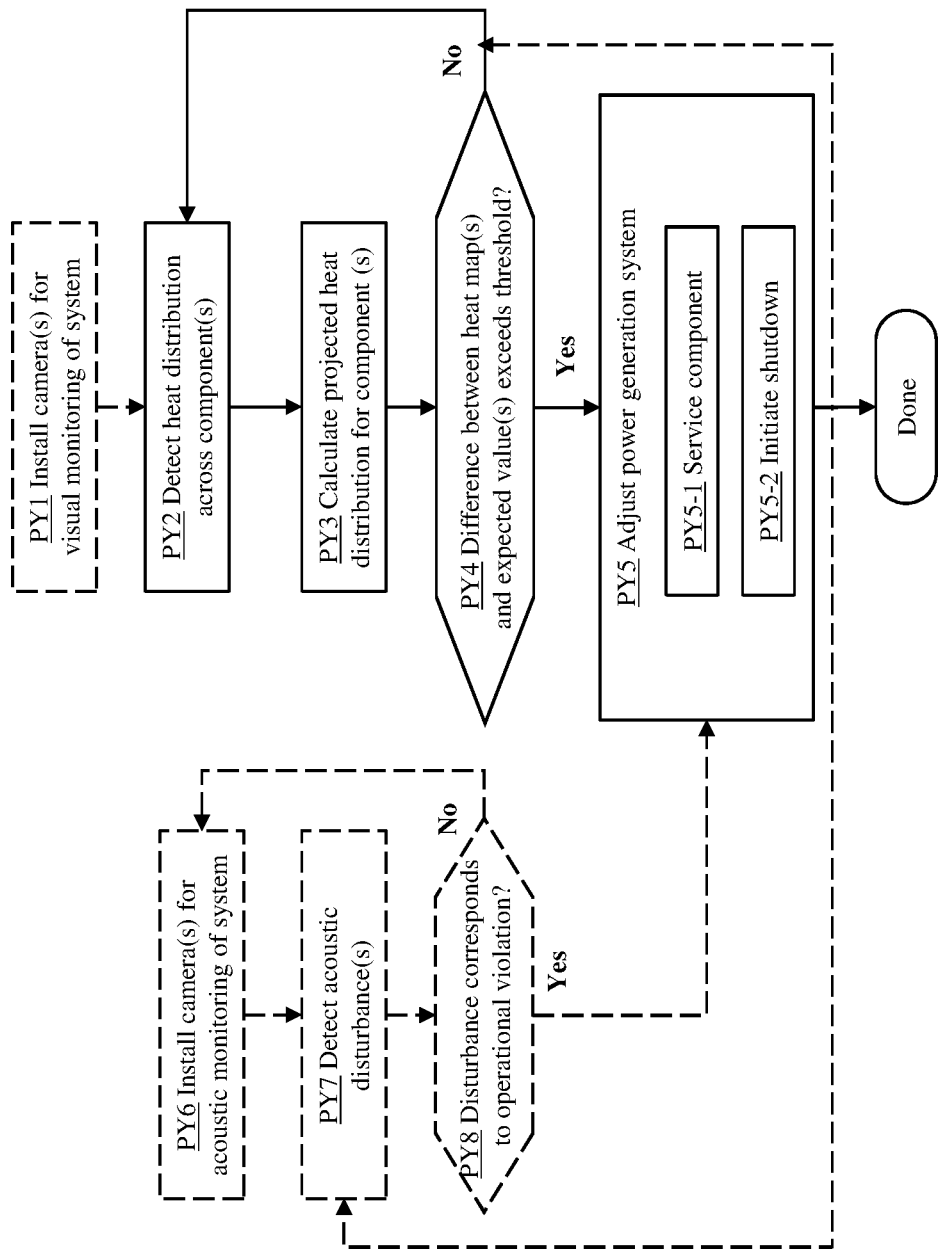
FIG. 7 provides an illustrative flow diagram of a method according to further embodiments of the present disclosure.

Referring now to FIGS. 3, 6, and 7, additional or alternative methods according to the disclosure may include controlling power generation system 152 based on the thermal properties of component(s) 102, 104, 110, 126, 128, which may be expressed and stored in library 300 in heat distribution field 304. Various embodiments of the disclosure may implement a dual analysis of thermal output and acoustic output of component(s) 102, 104, 110, 126, 128, to adjust power generation system 152 based on a wider variety of circumstances, possible threats, etc. Methods according to the disclosure may include one or more of processes PY1-PY8 described herein. As noted elsewhere, the example methodologies illustrated in FIG. 7 and described herein may be combined with one or more other methods described herein, e.g., simultaneously or sequentially, where desired.

An initial process PY1 may include installing one or more camera(s) 162 within power generation system 152. Process PY1 may be substantially the same as process PX1 (FIG. 4) described elsewhere herein, apart from possible differences to the camera hardware being installed, the location where cameras are installed and the detectability of component(s) 102, 104, 110, 126, 128, etc. Camera(s) 162 can be installed by a party implementing the various process steps described herein and/or another party before processes of the present disclosure are implemented. As such, process PY1 is shown in phantom to indicate that process PY1 may be a preliminary step which occurs before other processes according to the present disclosure. Camera(s) 162 installed in process PY1 may include, e.g., one or more infrared cameras capable of visually detecting the heat output from component(s) 102, 104, 110, 126, 128 within the field of view of camera(s) 162. The installing of camera(s) 162 in process PY1 may include, e.g. electrically and mechanically coupling each camera 162 to a mounting component or fixture provided within power generation system 152. A location for each camera 162 may be selected such that field of vision $F_{vis}$ (FIG. 5) for at least one camera 162 will visually monitor component(s) 102, 104, 110, 126, 128 and detect the heat output therefrom. The installation process may include, e.g., operating camera(s) 162 in a test mode to determine whether the desired component(s) 102, 104, 110, 126, 128 will be visually monitored. A user may operate camera(s) 162 manually to determine whether each component 102, 104, 110, 126, 128 to be monitored appears in the field view of the installed camera(s) 162. The subsequent visual monitoring of component(s) 102, 104, 110, 126, 128, may be implemented automatically by system controller 170, and without user intervention, as described herein.

Continuing to process PY2, each camera 162 may operate independently of power generation system 152 to detect the heat distribution across each component 102, 104, 110, 126, 128 being monitored. As noted elsewhere herein, the heat distribution for each component may include, e.g., a two dimensional map of component(s) 102, 104, 110, 126, 128, indicating locations which violate a respective temperature threshold. In various other embodiments, the heat distribution may include, e.g., any conceivable tabulation of detected temperatures and/or thermal properties accumulated at respective positions on one component 102, 104, 110, 126, 128 being monitored. In a further example, the heat distribution may be, e.g., a temperature of a tank at its foundation, and a temperature of the same tank at its fluid outlet, each indexed with respect to the time when these temperatures are recorded. In a more sophisticated example, the detected heat distribution may constitute a two-dimensional or three-dimensional coordinate map of the monitored component 102, 104, 110, 126, 128 at a time of measurement, with each coordinate being associated with a corresponding temperature or thermal energy output. Process PY2 thus may include, e.g., recording or otherwise obtaining photographic or video footage of component(s) 102, 104, 110, 126, 128 at a particular time to detect the heat distribution. In some cases, process PY2 may include continuous video monitoring of component(s) in component(s) 102, 104, 110, 126, 128 of power generation system 152. In other cases, process PY2 may include burst-capture photography of component(s) 102, 104, 110, 126, 128 at particular intervals, e.g., capturing one image per predetermined interval (e.g., five-minute span) of operation.

The detecting of heat distributions for component(s) 102, 104, 110, 126, 128 being monitored in process PY2 may yield a photographic or video record of temperatures, pressures, generated energy, flow rates, etc., for a particular component 102, 104, 126, 128 in power generation system 152. In conventional settings, a user or inspector would manually examine each component 102, 104, 110, 126, 128 for temperature-related anomalies. In embodiments of the disclosure, system controller 170 automatically detects the heat distribution of each component 102, 104, 110, 126, 128 under analysis via camera(s) 162. In the case of an infrared camera, the detected images may be stored directly in heat distribution field 304 of library 300. In other cases, the detected images may be cross-referenced with measured temperatures, times, coordinates, component IDs, etc., and stored in heat distribution field 304, e.g., in the form of a table. In this case, the conversion from records provided by camera(s) 162 to heat distributions storable, e.g., in heat distribution field 304 of library 300 may be implemented via modules 222 via any currently known or later developed method for converting portions of an image to data.

After detecting the heat distribution for component(s) 102, 104, 110, 126, 128 the method may proceed to process PY3 of calculating one or more projected heat distribution(s) for component(s) 102, 104, 110, 126, 128. Embodiments of the disclosure, in some cases, may detect a different accumulation of heat in one or more component(s) 102, 104, 110, 126, 128 than is otherwise acceptable. For example, embodiments of the disclosure are operable to detect, e.g., via camera(s) 162 and based on infrared imaging where applicable, whether one or more component(s) 102, 104, 110, 126, 128 have unacceptable thermal stress, have malfunctioned, are at risk of rupturing, etc. Process PY3 includes using other data, e.g., detected by sensor(s) 180 or included in library 300, to calculate an expected heat distribution for each component 102, 104, 110, 126, 128 under analysis. The calculating in process PY3 may implemented, e.g., using modules 222 of analysis program 220, or by direct reference to one or more sets of data included in library 300.

In an example, sensor(s) 180 and current operating settings of power generation system 152 may indicate that combustor should have a firing temperature of e.g., approximately 1450° C. when generating an energy output of approximately fifty megawatts (MW). However, camera(s) 162 positioned to visually monitor combustor(s) 110 may detect a firing temperature that is too high (e.g., 1525° C.) or too low (e.g., 1400° C.) for a particular setting. In a similar fashion, expected values for the temperature of various other components (e.g., inlet and outlet lines, the temperature of various protective casings, etc.) may be calculable for any component being visually monitored with camera(s) 162. The calculated heat distribution may be specific as to the expected temperature and location for a given component. For instance, an inlet line to turbine component 104 may have an expected temperature distribution that is higher at a junction with combustor 110 than at a junction with the entrance to turbine component 104. The expected value calculated in process PY3 may thus indicate the heat distribution for an idealized operation under the given operating settings of power generation system 152.

Continuing to process PY4, methods according to the disclosure analyze the difference between the detected heat distribution(s) for component(s) 102, 104, 110, 126, 128 under analysis, as detected in process PY2 and the projected value(s) of the heat distribution for the same component(s) 102, 104, 110, 126, 128 as calculated in process PY3. Embodiments of the disclosure can thus determine whether the detected heat distribution(s) for each component are with an acceptable range of the projected heat distribution(s) for the same operating settings or circumstances. Process PY4 may include determining whether a difference between the detected heat distribution(s) for component(s) 102, 104, 110, 126, 128, e.g., as expressed in heat distribution field 304, differ from the projected values of process PY3 by at least a predetermined threshold. The predetermined threshold may be stored in library 300 within threshold field 310, as discussed elsewhere herein.

In an illustrative example, the projected heat distribution calculated in process PY3 may be an outlet temperature of approximately 1400° C. at the outlet portion of combustor 110. However, the detected heat distribution may include an outlet temperature of, e.g., approximately 1450° C. Threshold field 310 may specify a threshold value of 25° C. difference between measured and expected temperatures at the outlet of combustor 110. Thus, the difference indicates that combustor 110 is operating at an abnormally high temperature (e.g., by having more than a 25° C. temperature difference). In cases where the difference between the detected heat distribution, and its projected value, exceeds the predetermined threshold (i.e., "Yes" at process PY4), the method may proceed to process PY5 of adjusting power generation system 152, e.g., by servicing one or more components or shutting down power generation system 152 to prevent or mitigate damage to its components. In cases where the difference between the heat distribution and its projected value is within the predetermined threshold (i.e., "No" at process PY4), the method may conclude ("Done"). Where continuous monitoring of power generation system 152 is desired, the flow may return to process PY2 of detecting another heat distribution from the same component(s) or a different set of component(s).

In cases where process PY5 of adjusting power generation system 152 is implemented, the method may include any one or more sub-processes (e.g., processes PY5-1, PY5-2 shown in FIG. 5). The adjusting of power generation system 152 in process PY5 may be undertaken automatically via system controller 170, or in some cases may be undertaken with the aid of one or more operators, servicers, etc., of power generation system 152. In still further examples, system controller 170 may implement the adjusting in process PY5 substantially automatically, with an operator or servicer of power generation system 152 serving only to verify the results of the adjusting after it concludes. In an example sub-process PY5-1, embodiments of the disclosure may include repairing or otherwise servicing (simply "servicing" hereafter) component(s) 102, 104, 110, 126, 128 to resolve underlying heat dissipation problems with component(s) 102, 104, 110, 126, 128. The servicing in process PY5-1 may include, e.g., repairing or replacing any component(s) 102, 104, 110, 126, 128 even as power generation system 152 continues operating. In such cases, the servicing may include treating or reinforcing sensitive portions of affected component(s) 102, 104, 110, 126, 128 to improve their heat distribution(s).

In another examples, component(s) 102, 104, 110, 126, 128 may have non-compliant heat distributions as a result of, e.g., being improperly installed, having one or more defective parts, and/or being at the end of its useful life. In such cases, component(s) 102, 104, 126, 128 and/or gauge(s) 144 may require repair or replacement. Embodiments of the disclosure may include initiating a shutdown of power generation system 152 in process PY5-2, e.g., via system controller 170. To initiate a shutdown, system controller 170 may directly command one or more component(s) 102, 104, 126, 128 to transition into a shutdown mode, cease operating altogether, etc. In further examples, system controller 170 may sound an alarm, alert, or other indicator to initiate a shutdown of power generation system 152, or command another controller (not shown) to cease further operation of power generation system 152. It is understood that process PY5 may include various other additional or alternative sub-processes for adjusting, repairing, and/or replacing component(s) 102, 104, 110, 126, 128 of power generation system 152.

Embodiments of the disclosure may include additional processes for monitoring power generation system 152 based on acoustic outputs 148 detected via cameras 162 or other acoustic monitoring components in communication with system controller 170. Processes PY6-PY8 shown in FIG. 5 may be implemented together with processes PY1-PY5 described herein, or may be implemented separately or in combination with other processes described herein. According to an example, embodiments of the disclosure may include process PY6 of installing camera(s) 162 or other sensing components to enable acoustic monitoring of system 152. It is understood that PY6 may be the same process as PY1 (e.g., when cameras 162 include a microphone), or may be a separate process when distinct camera(s) 162 and/or other components for acoustic monitoring are installed. In any case, the method may proceed to process PY7 of detecting one or more acoustic disturbances within power generation system 152 as it operates. As used herein, an acoustic disturbance refers to one or more acoustic outputs 148 that are not expected to occur during operation of power generation system 152 according to its specifications and/or under its specified settings. To distinguish between acoustic outputs 148 that are expected, and acoustic disturbances to be monitored, camera(s) 162 and/or system controller 170 may include various noise filters and/or other criteria for identifying acoustic outputs 148 which constitute a disturbance.

Where camera(s) 162 or other acoustic monitoring devices detect acoustic output(s) 148 originating from multiple sources, and/or where noise (i.e., external acoustic signatures generated by sources other than component(s) 102, 104, 110, 126, 128 of power generation system 152) contaminates acoustic output(s) 148, process PY7 optionally may include processing acoustic output(s) 148 detected in process PY7 with system controller 170. The processing of acoustic signatures 166 may include using modules 222 of analysis program 220 (e.g., waveform processing modules) to perform actions including, e.g., splitting each detected acoustic output 148 into distinct waveforms to be stored in memory 212 (e.g., in acoustic profile field 308 of library 300), filtering acoustic waves with particular frequencies, amplitudes, etc., for removal, converting or simplifying acoustic signature(s) 146 into various waveform representations, etc.

Acoustic disturbances detected in process PY7 in some cases may originate from one or more operational violations including, e.g., component(s) 102, 104, 110, 126, 128 being in need of service, malfunctioning, being defective, and/or other similar problems. Acoustic disturbances detected in process P7 may also originate from operational violations caused by sources external to power generation system 152, e.g., a human or animal trespassing in a sensitive area of power generation system 152. To detect a broad range of operational violations, embodiments of the disclosure include determining in process PY8 whether the detected disturbance corresponds to one or more of the pre-determined operational violations. A set of acoustic profiles and/or other points of comparison may be included in library 300, e.g., as part of threshold field 310. Where the detected acoustic disturbance(s) corresponds to an operational violation (i.e., "Yes" at process PY8) the methodology may proceed to process PY5 to adjust power generation system as described elsewhere herein. Where the detected acoustic disturbance(s) do not correspond to an operational violation (i.e., "No" at process PY8), the method may conclude ("Done"), and/or optionally may return to process PY7 of detecting acoustic disturbance(s).

Figure 8:
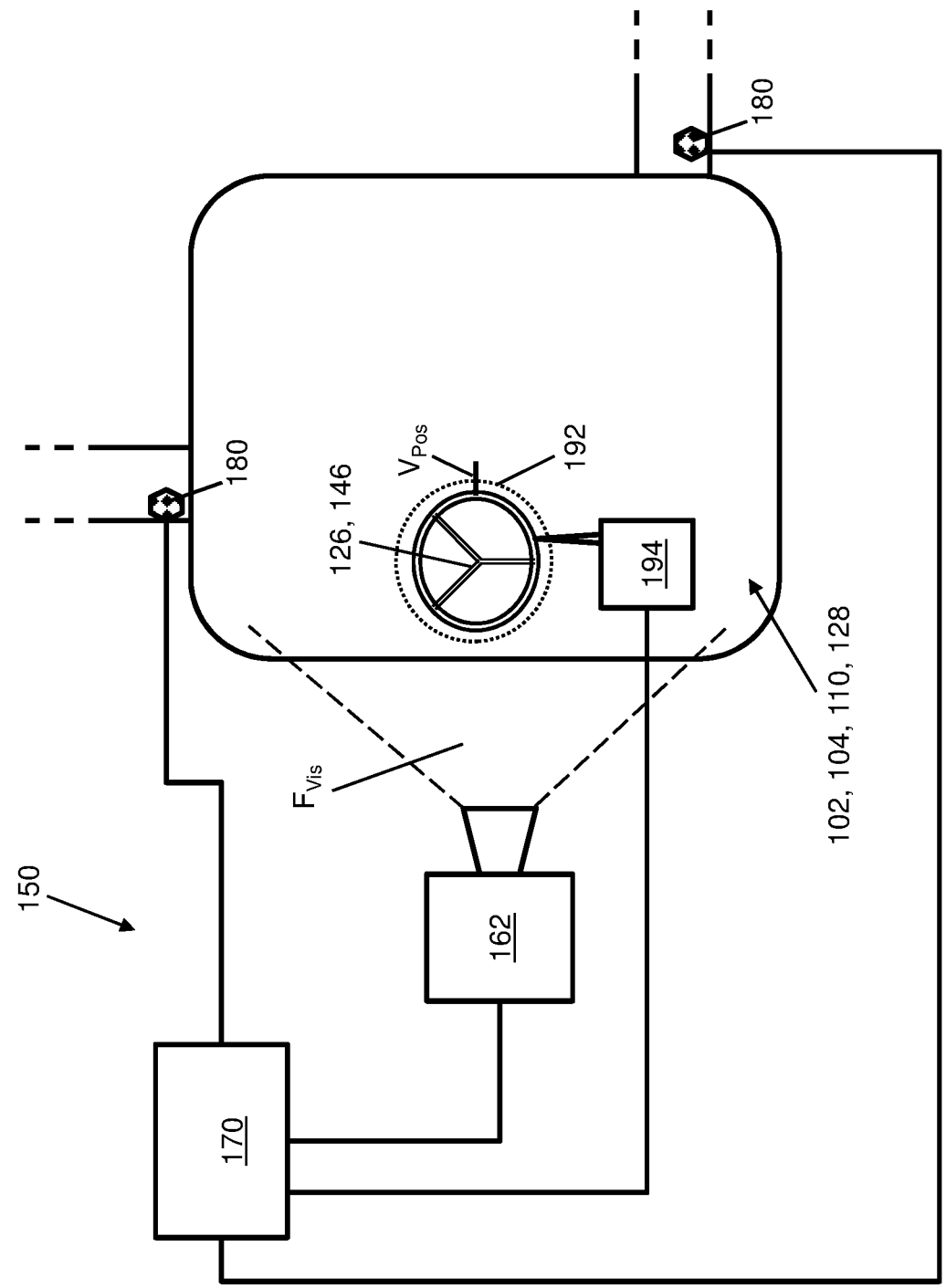
FIG. 8 provides an expanded schematic view of a system controller and camera for visually monitoring a valve according to embodiments of the present disclosure.

Turning to FIG. 8, an expanded schematic view of system controller 170 and camera 162 for monitoring valve(s) 146 is shown. Camera(s) 162 may have a field of vision $F_{vis}$ sized for visual monitoring of or more component(s) 102, 104, 110, 128 with a fluid flow controllable via valve(s) 126, 146. The position of valve(s) 126, 146 thus may control and define the fluid flow rate through component(s) 102, 104, 110, 128 to which it operatively connects. In the example of FIG. 8, component(s) 102, 104, 110, 128 may include visual markings 192 to determine a valve position $V_{Pos}$ by comparing the location and/or orientation of valve(s) 126, 146 with respect to visual markings 192. During operation, camera(s) 162 may visually monitor valve(s) 126, 146 to detect the degree of valve 126, 146 openness or closure based on visual markings 192. System controller 170 may be further operable to evaluate fluid flow rate(s) through component(s) 102, 104, 110, 128 via sensor(s) 180 in combination with camera(s) 162. System 150 in some cases may include an adjustment device 194 in communication with system controller 170, e.g., an electrical-mechanical converter, a robot, an actuator, etc., for physically adjusting the position of valve(s) 126, 146 based on signals issued by system controller(s) 170. As discussed herein, system controller 170 may implement various processes to detect and correct differences between the current valve position $V_{Pos}$ and a target valve position for creating a desired fluid flow rate.

Figure 9:
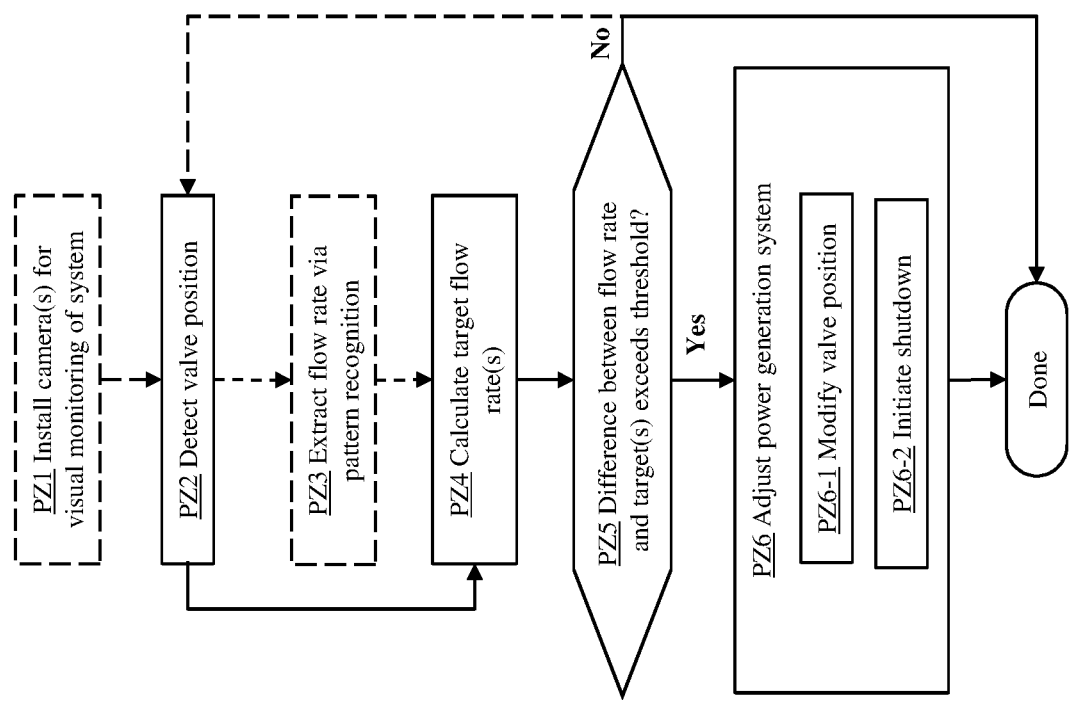
FIG. 9 provides an illustrative flow diagram of a method according to additional embodiments of the present disclosure.

Referring to FIGS. 3, 8, and 9 together, embodiments of the disclosure provide a method to control power generation system(s) 152 based on visual monitoring of valve(s) 126, 146 via camera(s) 162. Processes PZ1-PZ6 are shown by example in FIG. 9 as being implemented separately from other processes discussed elsewhere herein, but it is understood that each example flow diagram and set of processes discussed in embodiments of the disclosure may be implemented sequentially and/or simultaneously. It is understood that any or all of the various processes discussed herein optionally may be combined and implemented together substantially as a set of combined processes or sub-processes wherever possible.

An initial process PZ1 may include installing one or more camera(s) 162 within power generation system 152. Camera(s) 162 can be installed by a party implementing the various process steps described herein and/or another party before processes of the present disclosure are implemented. As such, process PZ1 is shown in phantom to indicate that process PZ1 may be a preliminary step which occurs before other processes according to the present disclosure. The installing of cameras in process PZ1 may include, e.g. electrically and mechanically coupling each camera 162 to a mounting component or fixture provided within power generation system 152. A location for each camera 162 may be selected such that at least one camera 162 may visually monitor valve(s) 126, 146, including the position of valve(s) 126, 146 within its adjustable range. The visible position of valve(s) 126, 146 may indicate the rate of fluid flow within a corresponding fluid flow section of power generation system 152. The installation process may include, e.g., operating camera(s) 162 in a test mode to determine whether valve(s) 126, 146 selected for analysis will be visually monitored. A user may operate camera(s) 162 manually to determine whether each valve 126, 146 to be monitored appears in the field view of the installed camera(s) 162. The subsequent visual monitoring of valve(s) 126, 146 may be implemented automatically by system controller 170, and without user intervention, as described herein.

At process PZ2, each camera 162 may operate independently of power generation system 152 to detect the position of valve(s) 126, 146 to identify the corresponding flow rate of fluids within a portion of power generation system 152. Process PZ2 thus may include, e.g., recording or otherwise obtaining photographic or video footage of valve(s) 126, 146 at a particular time, with the position(s) of each valve 126, 146 being visible. In some cases, process PZ2 may include continuous video monitoring of power generation system 152. In other cases, process PZ2 may include burst-capture photography of valve(s) 126, 146 at particular intervals, e.g., capturing one image per predetermined interval (e.g., five-minute span) of operation. The detecting of valve(s) 126, 146 in process PZ2 may yield a photographic or video record of the fluid flow rate through a corresponding portion of power generation system 152. In conventional settings, a user or inspector would manually examine each valve 126, 146 to identify its position. In embodiments of the disclosure, system controller 170 detects the position of valve(s) 126, 146 automatically via camera(s) 162. The conversion from images or video provided by camera(s) 162 to valve position measurements storable, e.g., in valve position field 308 of library 300 may be implemented via any currently known or later developed method for converting portions of an image to data.

Turning to process PZ3, depicted in phantom to indicate an optional procedure, the method may include implementing pattern recognition on images or video captured by camera(s) 162 to isolate or extract the valve 126, 146 positions visible therein. According to an example, modules 222 of computing device 200 may include one or more algorithms, look-up tables, mathematical formulas, etc., capable of automatically identifying one or more portions of an image, or video, as illustrating a gauge measurement. In a more specific example, at least one valve 126, 146 may include visual identifiers 192 (FIG. 8) in the form of a contrasting-colored measuring instrument (e.g., red marker on a rotatably adjustable valve) to for identify the degree to which valve(s) 126, 146 are open or closed. Camera 162 and/or system controller 170 additionally may include physical image filters and/or similar tools for isolating irrelevant sections of an image or video feed to better identify the position of valve(s) 126, 146. Gauge measurements detected in PZ2, and PZ3 where applicable, may be stored in valve position field 306 of library 300.

The method may continue by implementing process PZ4 of calculating one or more target flow rates to be controlled by valve(s) 126, 146 during a given state of operation (e.g., startup, transient, steady state, downturn, etc.). Embodiments of the disclosure, in some cases, may detect a position of valve(s) 126, 146 that is inconsistent with the target position for creating desired fluid flow rate. For example, embodiments of the disclosure are operable to detect, e.g., whether one or more valve(s) 126, 146 are too far open, or too far closed, relative to their desired position for a particular type of operation. Process PZ4 includes using other data, e.g., detected by sensor(s) 180 or included in library 300, and/or direct commands to system controller 170, to calculate a target flow rate of fluid(s) controlled by valve(s) 126, 146. The calculating in process PZ4 may implemented, e.g., using modules 222 of analysis program 220, or by direct reference to one or more sets of data included in library 300. In an example, sensor(s) 180 may detect, during steady state operation, a valve position of 90% open to produce a fluid flow of 4600 kilograms per hour through turbine component 104. Where transient operation has initiated, a user may desire to partially close valve(s) 126, 146 to control the fluid flow through turbine component 104. In this case, modules 222 of analysis program 220 may calculate a valve position suitable to produce a reduced fluid flow (e.g., approximately 3000 kilograms per hour) for transient operation, e.g., by application of predetermined correlations, material properties of turbomachine 100, etc. According to the same example, modules 222 may calculate a target flow rate of 3000 kilograms per hour, which may be associated with valve(s) 126, 146 being in a 50% open position. The target flow rate calculated in process PZ4 may thus indicate the desired fluid flow for a present or upcoming operating mode of power generation system 152.

Continuing to process PZ5, methods according to the disclosure analyze the difference between the current valve 126, 146 position, as detected in processes PZ2, PZ3, and the target valve 126, 146 position as calculated in process PZ4. Embodiments of the disclosure can determine whether the valve 126, 146 position(s) are consistent their target values for various circumstances. Process PZ5 may include determining whether a difference between the flow rate for the current valve 126, 146 position(s), e.g., as expressed in valve position field 308, differ from the target flow rate(s) by at least a predetermined threshold. The predetermined threshold may be stored in library 300 within threshold field 310, as discussed elsewhere herein. In an illustrative example, the target fluid flow rate through turbine component 104 may be, e.g., 3000 kilograms per second, which may arise from valve(s) 126, 146 being in a 60% open position. However, valve(s) 126, 146 may be in a 90% open position, e.g., due to previous steady-state operation. Threshold field 310 may specify a threshold value of 5% valve 126, 146 openness difference between detected and target values for valve openness, e.g., indicating that valve 126, 146 cannot differ from its target position by more than approximately 5% openness. In cases where the difference between the flow rate for a given valve 126, 146 position, differs from its target value by the predetermined threshold (i.e., "Yes" at process PZ5), the method may proceed to process PZ6 of adjusting power generation system 152, e.g., by modifying the position(s) of valve(s) 126, 146 or shutting down power generation system 152 for servicing and/or further adjustment. In cases where the difference between the flow rate for the current valve 126, 146 position(s) and the target flow rate is within the predetermined threshold (i.e., "No" at process ZX5), the method may conclude ("Done"). Where continuous monitoring of power generation system 152 is desired, the flow may return to process PZ2 of again detecting the position(s) of valve(s) 126, 146 or different valve(s) 126, 146.

In cases where process PZ6 of adjusting power generation system 152 is implemented, the method may include various sub-processes (e.g., processes PZ6-1, PZ6-2 shown in FIG. 9). The adjusting of power generation system 152 in process PZ6 may be undertaken automatically via system controller 170, or in some cases may be undertaken with the aid of one or more operators, servicers, etc., of power generation system 152. In still further examples, system controller 170 may implement the adjusting in process PZ6 substantially automatically, with an operator or servicer of power generation system 152 serving only to verify the results of the adjusting after it concludes. In an example sub-process PZ6-1, embodiments of the disclosure may include modifying the position of valve(s) 126, 146 to achieve the target flow rate(s) therethrough. The adjusting in process PX6-1 may include, e.g., causing a user adjustment device 194 (FIG. 8) (e.g., an adjustment mechanism of power generation system 152 and/or other device external to power generation system 152 and in communication with system controller 170, such as a robot) to mechanically adjust valve(s) 126, 146. In alternative examples where valve(s) 126, 146 are at least partially automated, system controller 170 may directly adjust valve(s) 126, 146 until the target flow rate is reached.

In another example, valve(s) 126, 146 may be in an undesired position, e.g., due to being improperly modified, adjusted, having one or more defective parts, and/or being at the end of its useful life. In such cases, valve(s) 126, 146 may require servicing. To initiate servicing of valve(s) 126, 146, embodiments of the disclosure may include initiating a shutdown of power generation system 152 in process PZ6-2, e.g., via system controller 170. To initiate a shutdown, system controller 170 may directly command one or more component(s) 102, 104, 126, 128 to transition into a shutdown mode, cease operating altogether, etc. In further examples, system controller 170 may sound an alarm, alert, or other indicator to initiate a shutdown of power generation system 152, or command another controller (not shown) to cease further operation of power generation system 152. It is understood that process PZ6 may include various other additional or alternative sub-processes for adjusting power generation system 152 to modify valve(s) 126, 146, or more generally to modify various aspects of power generation system 152.

Technical effects of the invention are to automatically monitor and adjust operating parameters of power generation system 152 based on various criteria. In one example, technical effects of the invention are to automatically adjust the measurements displayed on gauge(s) 144 based on expected operating parameters, or automatically shutting down power generation system 152 in the event that one or more gauge(s) 144 fail. In another example, technical effects of the invention are to automatically adjust, or automatically initiate servicing of, various component(s) 102, 104, 126, 128 upon detecting a non-conforming heat distribution, and/or to automatically shut down further operation of power generation system 152 upon detecting a non-conforming heat distribution. In yet another example, technical effects of the invention are to recognize when the fluid flow through valve(s) 126, 146 does not meet a target amount of fluid flow, and thereafter automatically adjust the position of valve(s) 126, 146 to meet the target fluid flow, or otherwise cease operation of power generation system 152. In each example, the determination may be based at least partially on images and/or video collected by visually monitoring power generation system(s) 152 with camera(s) 162. Advantages of the present disclosure include, e.g., reducing or eliminating the need for people to visually inspect and record various attributes of power generation system(s) 152 on-site. Additional advantages of the present disclosure include the ability for one or more system controllers 170 to automatically control, via visual monitoring, various properties of multiple power generation systems 152 via the internet as part of a network of remote power generation system(s) 152.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a power generation system, the power generation system including a controller, the controller configured for performing actions in the method including:
   visually monitoring a component of the power generation system;
   detecting a heat distribution across the component of the power generation system from a thermal output of the component during operation of the power generation system;
   calculating a projected heat distribution across the component based on a library of modeling data for the power generation system;
   calculating whether a difference between the heat distribution and the projected heat distribution exceeds a thermal threshold;
   adjusting the power generation system in response to the difference exceeding the predetermined threshold, wherein the adjusting includes modifying an operating setting of the power generation system; and
   wherein the power generation system is positioned at a first geographic location, the controller is positioned at least partially at a second geographic location remote and different from the first geographic location, and wherein the power generation system is one of a plurality of power generation systems, each of the plurality of power generation systems being positioned at a different respective geographic location.

2. The method of claim 1, wherein the library of modeling data includes at least one of operating data of the power generation system, or operating data of a different power generation system.

3. The method of claim 1, wherein the library of modeling data includes at least one of projected operating data of the power generation system or a different power generation system.

4. The method of claim 1, further comprising:
   detecting an acoustic disturbance from a source external to the power generation system;
   determining whether the detected acoustic disturbance corresponds to a predetermined operational violation; and
   modifying the operating setting of the power generation system in response to determining that the detected acoustic disturbance corresponds to the predetermined operational violation.

5. The method of claim 1, wherein the visually monitoring the component of the power generation system includes causing an infrared camera to capture an image of the component, the infrared camera being operationally independent of the power generation system.

6. The method of claim 5, wherein the adjusting of the power generation system is implemented via a system controller in communication with the infrared camera and the power generation system.

7. A program product stored on a computer readable storage medium for controlling a power generation system, the power generation system including a controller, the controller including the computer readable storage medium comprising program code for causing a computer system to perform actions including:
   visually monitoring a component of the power generation system;
   detecting a heat distribution across the component of the power generation system based on a thermal output of the component during operation of the power generation system;
   calculating a projected heat distribution across the component based on a library of modeling data for the power generation system;
   calculating whether a difference between the heat distribution and the projected heat distribution exceeds a thermal threshold;
   adjusting the power generation system in response to the difference exceeding the predetermined threshold, wherein the adjusting includes modifying an operating setting of the power generation system; and
   wherein the power generation system is positioned at a first geographic location, the controller is positioned at least partially at a second geographic location remote and different from the first geographic location, and wherein the power generation system is one of a plurality of power generation systems, each of the plurality of power generation systems being positioned at a different respective geographic location.

8. The program product of claim 7, wherein the library of modeling data includes at least one of operating data of the power generation system, or operating data of a different power generation system.

9. The program product of claim 7, wherein the library of modeling data includes at least one of projected operating data of the power generation system or a different power generation system.

10. The program product of claim 7, wherein visually monitoring the component of the power generation system includes causing an infrared camera to capture an image of the component, the infrared camera being operationally independent of the power generation system.

11. The program product of claim 7, wherein modifying the operating setting of the power generation system includes initiating a system shutdown of the power generation system.

12. The program product of claim 7, further comprising program code for causing the computer system to perform actions including:
  detecting an acoustic disturbance from a source external to the power generation system;
  determining whether the detected acoustic disturbance corresponds to a predetermined operational violation; and
  modifying the operating setting of the power generation system in response to determining that the detected acoustic disturbance corresponds to the predetermined operational violation.

13. A system for controlling a power generation system, the system comprising:
  an infrared camera operable to visually monitor a component of the power generation system;
  a system controller in communication with the infrared camera and operable to, during operation of the power generation system, perform actions including:
    detecting a heat distribution across a component of the power generation system based on a thermal output of the component;
    calculating a projected heat distribution across the component based on a library of modeling data for the power generation system;
    calculating whether a difference between the heat distribution and the projected heat distribution exceeds a thermal threshold;
  adjusting the power generation system in response to the difference exceeding the predetermined threshold, wherein the adjusting includes modifying an operating setting of the power generation system; and
  wherein the power generation system is positioned at a first geographic location, the controller is positioned at least partially at a second geographic location remote and different from the first geographic location, and wherein the power generation system is one of a plurality of power generation systems, each of the plurality of power generation systems being positioned at a different respective geographic location.

14. The system of claim 13, wherein the system controller further performs actions including:
  detecting an acoustic disturbance from a source external to the power generation system;
  determining whether the detected acoustic disturbance corresponds to a predetermined operational violation; and
  modifying the operating setting of the power generation system in response to determining that the detected acoustic disturbance corresponds to the predetermined operational violation.

15. The system of claim 13, wherein the library of modeling data includes at least one of operating data of the power generation system, or operating data of a different power generation system.

16. The system of claim 13, wherein the library of modeling data includes at least one of projected operating data of the power generation system or a different power generation system.

17. The system of claim 13, wherein modifying the operating setting of the power generation system includes initiating a system shutdown of the power generation system.

* * * * *